United States Patent
Craighill et al.

(10) Patent No.: US 12,062,879 B2
(45) Date of Patent: Aug. 13, 2024

(54) PARTITIONED CABLE JOINT FOR SUPERCONDUCTING CABLES

(71) Applicants: Massachusetts Institute of Technology, Cambridge, MA (US); Commonwealth Fusion Systems LLC, Cambridge, MA (US)

(72) Inventors: Christopher Craighill, Cambridge, MA (US); Alexey Radovinsky, Cambridge, MA (US); Rui Vieira, Billerica, MA (US); Vincent Fry, Waltham, MA (US); Colin O'Shea, Cambridge, MA (US); Sera Evcimen, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 164 days.

(21) Appl. No.: 17/333,314

(22) Filed: May 28, 2021

(65) Prior Publication Data
US 2021/0376498 A1 Dec. 2, 2021

Related U.S. Application Data

(60) Provisional application No. 63/032,277, filed on May 29, 2020.

(51) Int. Cl.
*H01R 4/00* (2006.01)
*H01B 12/02* (2006.01)
*H01R 4/68* (2006.01)

(52) U.S. Cl.
CPC ............... *H01R 4/68* (2013.01); *H01B 12/02* (2013.01)

(58) Field of Classification Search
CPC .................... H01R 4/68; H01B 12/02
See application file for complete search history.

(56) References Cited

U.S. PATENT DOCUMENTS

| | | |
|---|---|---|
| 2,309,607 A | 1/1943 | Rogoff |
| 8,437,819 B2 | 5/2013 | Takayasu et al. |
| 9,183,970 B2 | 11/2015 | Maeda et al. |
| 9,941,032 B2 | 4/2018 | Jin et al. |
| 10,062,485 B2 | 8/2018 | Iwasa et al. |
| 10,079,092 B2 | 9/2018 | Iwasa et al. |
| 2014/0243207 A1 | 8/2014 | Takayasu |

(Continued)

FOREIGN PATENT DOCUMENTS

| | | |
|---|---|---|
| CA | 3 170 080 | 9/2021 |
| CN | 106911014 | 6/2017 |

(Continued)

OTHER PUBLICATIONS

CN107104293 Englsih Translation (Year: 2017).*
(Continued)

*Primary Examiner* — Pete T Lee
(74) *Attorney, Agent, or Firm* — Daly, Crowley, Mofford & Durkee, LLP

(57) ABSTRACT

Described is a partitioned cable joint comprising a plurality of physically distributed joint elements with the plurality of joint elements taken together defining a joint length. Joint elements may have a first mounting region having a shape selected to accept one petal of superconducting cable and a second mounting region having a shape selected to accept one petal of a second conductor.

19 Claims, 13 Drawing Sheets

(56) References Cited

U.S. PATENT DOCUMENTS

| | | | |
|---|---|---|---|
| 2016/0155541 | A1 | 6/2016 | Jenner et al. |
| 2016/0240297 | A1 | 8/2016 | Iwasa |
| 2017/0338009 | A1 | 11/2017 | van der Laan |
| 2018/0226730 | A1* | 8/2018 | Fietz ............... H01R 4/187 |
| 2020/0005968 | A1 | 1/2020 | van der Laan |
| 2020/0059017 | A1 | 2/2020 | Huang et al. |
| 2021/0350957 | A1 | 11/2021 | Takayasu |
| 2023/0101820 | A1 | 3/2023 | Radovinsky et al. |

FOREIGN PATENT DOCUMENTS

| | | |
|---|---|---|
| CN | 107104293 A | 8/2017 |
| CN | 109148074 | 1/2019 |
| FR | 1585965 | 2/1970 |
| GB | 2578307 A | 5/2020 |
| JP | S 57194467 | 11/1982 |
| JP | H 0439875 A | 2/1992 |
| JP | 2005310507 | 11/2005 |
| WO | WO 2014/201242 A1 | 12/2014 |
| WO | WO 2015/129272 A1 | 9/2015 |
| WO | WO 2018/181561 A1 | 10/2018 |
| WO | WO 2021/097049 A1 | 5/2021 |
| WO | WO 2021/257145 64 | 12/2021 |
| WO | WO 2022/019989 A2 | 1/2022 |

OTHER PUBLICATIONS

Haight et al., "Re-Markable Joint with Insulation for REBCO Superconductor Cables", IEEE Transactions on Applied Superconductivity, Vo. 29, No. 5, Aug. 2019; 5 pages.

Imagawa et al., "Test of ITER-TF Joint Samples with NIFS Test Facilities", IEEE Transactions on Applied Superconductivity, vol. 28, No. 3, Apr. 2018; 5 Pages.

Takahashi et al., "Development of ITER-CS Model Coil Terminal Assembling by Using Indium Wires", Fusion Engineering and Design, pp. 58-59 and 93-97; Jan. 2001; 5 Pages.

Yao et al., "R&D Activities of Joint Manufacture for ITER Poloidal Field Coil", Plasma Science Technology, vol. 17, No. 7;Jul. 2015; 6 Pages.

U.S. Appl. No. 17/777,488, filed May 17, 2022, Hartwig, et al.

Bykovsky, et al.; "Damage Investigations in the HTS Cable Prototype After the Cycling Test in EDIPO"; IEEE Transactions on Applied Superconductivity; vol. 28; No. 4; Jun. 2018; 5 Pages.

Goyal, et al. "High critical current density superconducting tapes by epitaxial deposition of $YBa_2Cu_3O_x$ thick films on biaxially textured metals"; Applied Physics Letters 69 (12); pp. 1795-1797; Sep. 1996; 3 Pages.

Haight, et al.; "Re-Makeable Joint With Insulation for REBCO Superconductor Cables"; IEEE Transaction on Applied Superconductivity; vol. 29; No. 5; Aug. 2019; 5 Pages.

Imagawa, et al., "Test of ITER-TF Joint Sample With NIFS Test Facilities"; IEEE Transactions on Applied Superconductivity; vol. 28; No. 3; Apr. 2018; 5 Pages.

Maeda, et al.; "The MIRAI Program and the New Super-High Field NMR Initiative and Its Relevance to the Development of Superconducting Joints in Japan"; IEEE Transactions on Applied Superconductivity; vol. 29; No. 5; Aug. 2019; 9 Pages.

Markiewicz, et al.; "Design of a Superconducting 32 T Magnet with REBCO High Field Coils"; IEEE Transactions on Applied Superconductivity; vol. 22; No. 3; Jun. 2012; 4 Pages.

Martovetsky, et al.; "Qualification of the Joints for the ITER Central Solenoid"; IEEE Transactions on Applied Superconductivity; vol. 22; No. 3; Jun. 2012; 4 Pages.

Mei, et al.; "Effects of Cooling Rate on Mechanical Properties of Near-Eutectic Tin-Lead Solder Joints"; Journal of Electronic Materials; vol. 20; No. 8; pp. 599-608; Jan. 1991; 10 Pages.

Prasad, et al.; "Fabrication of new joints for SST-1 TF coil winding packs"; Fusion Engineering and Design 88; pp. 2945-2949; Jan. 2013; 5 Pages.

Search Report and Written Opinion of the ISA dated Mar. 17, 2021 for International Application No. PCT/US2020/062793; 15 Pages.

Takahashi, et al.; "Development of ITER-CS mode coil terminal assembling by using indium wires"; Fusion Engineering and Design 58-59; pp. 93-97; Jan. 2001; 5 Pages.

Takayasu, et al.; "Cabling Method for High Current Conductors Made of HTS Tapes"; IEEE Transactions on Applied Superconductivity; vol. 21; No. 3; pp. 2340-2344; Jun. 2011; 5 Pages.

Tsui, et al.; "Soldered joints—an essential component of demountable high temperature superconducting fusion magnets"; Superconductor Science and Technology 29; Jan. 2016; 16 Pages.

Uglietti, et al.; "Progressing in cable-in-conduit for fusion magnets: from ITER to low cost, high performance DEMO"; Superconductor Science and Technology 31; Jan. 2018; 10 Pages.

Usoskin, et al.; "Large Area YBCO-Coated Stainless Steel Tapes With High Critical Currents"; IEEE Transactions on Applied Superconductivity; vol. 13; No. 2; pp. 2452-2457; Jun. 2003; 6 Pages.

Van der Laan, et al.; "Status of CORC® cables and wires for use in high-field magnets and power systems a decade after their introduction"; Superconductor Science and Technology; 32; Feb. 12, 2019; 34 Pages.

Yao, et al.; "R&D Activities of Joint Manufacture for ITER Poloidal Field Coil"; Plasma Science and Technology; vol. 17; No. 7; Jul. 2015; 6 Pages.

International Preliminary Report on Patentability dated Jun. 16, 2022 for International Application No. PCT/US2020/062793; 9 Pages.

Response to Comm. Rule 161/162 dated Jul. 13, 2022, filed on Dec. 1, 2022 for International Application No. 20829242.5; 22 Pages.

Japanese Office Action dated May 9, 2023 for Japanese Application No. JP 2022-533433; 6 Pages.

Restriction Requirement dated Jun. 16, 2023 for U.S. Appl. No. 17/333,311; 5 Pages.

Restriction Requirement dated Oct. 12, 2022 for U.S. Appl. No. 17/245,863; 6 Pages.

Response to Restriction Requirement dated Oct. 12, 2022 for U.S. Appl. No. 17/245,863, filed Nov. 30, 2022; 1 Page.

Office Action dated Dec. 21, 2022 for U.S. Appl. No. 17/245,863; 13 Pages.

Response to Office Action dated Dec. 21, 2022 for U.S. Appl. No. 17/245,863, filed Mar. 21, 2023; 9 Pages.

Notice of Allowance dated May 17, 2023 for U.S. Appl. No. 17/245,863; 9 Pages.

Response to Restriction Requirement dated Jun. 16, 2023 for U.S. Appl. No. 17/333,311, filed Aug. 16, 2023; 1 Page.

Response to Communication Rule 161 EPC dated Oct. 12, 2022 for European Application No. 21715028.3; as filed Mar. 20, 2023; 14 Pages.

U.S. Non-Final Office Action dated Sep. 28, 2023 for U.S. Appl. No. 17/333,311; 12 Pages.

IOP Science, "Investigation of a Rutherford cable using coated conductor Roebel cables as strands", Kario et al., IOP Publishing, 2013; 7 pages.

Japanese Office Action (with English translation) dated Aug. 28, 2023 for Japanese Application No. 2022-533433; 5 pages.

Response to Japanese Office Action (with English translation) dated Aug. 28, 2023 for Japanese Application No. 2022-533433; Response filed on Nov. 21, 2023; 7 pages.

PCT International Search Report and Written Opinion dated Feb. 1, 2022 for International Application No. PCT/US21/30207; 13 pages.

PCT International Search Report and Written Opinion dated Feb. 12, 2024 for International Application No. PCT/US2022/030047; 18 Pages.

PCT International Preliminary Report on Patentability dated Feb. 22, 2024 for International Application No. PCT/US2022/030047; 11 Pages.

Fietz et al., "High Temperature Superconductor Cables for EU-DEMO TF-Magnets;" Journal Article from Fusion Engineering and Design 125; Available Online Aug. 31, 2017; pp. 290-293; 4 Pages.

Granetz et al., "Demonstration High Temperature Superconducting Non-Planar Stellarator Magnet with Advanced Manufactured Assemblies;" PowerPoint Presentation from BETHE Kickoff Virtual Workshop; Aug. 11-12, 2020; 5 Pages.

(56) References Cited

OTHER PUBLICATIONS

Hartwig et al., "VIPER: An Industrially Scalable High-Current High-Temperature Superconductor Cable;" Journal Article from Superconducting Science Technology 33; Published Oct. 7, 2020; 8 Pages.

Mcintyre et al., "Blocks-in-Conduit: REBCO Cable for a 20T @ 20K Toroid for Compact Fusion Tokamaks;" Proceedings of IEEE Transactions on Applied Superconductivity, vol. 31, No. 5; Aug. 2021; 5 Pages.

Takayasu et al., "Electrical and Mechanical Characteristics of HTS Twisted Stacked-Tape Cable Conductor;" Proceedings of the IEEE Transactions on Applied Superconductivity, vol. 27, No. 4; Jun. 2017; 5 Pages.

PCT International Search Report and Written Opinion dated Feb. 5, 2024 for International Application No. PCT/US2023/077370; 22 Pages.

Uglietti, "A Review of Commercial High Temperature Superconducting Materials for Large Magnets: From Wires and Tapes to Cables and Conductors;" a Topical Review in Superconducting Science and Technology, vol. 32; Published Apr. 9, 2019; 29 Pages.

\* cited by examiner

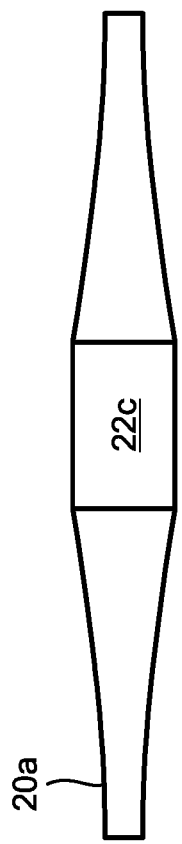
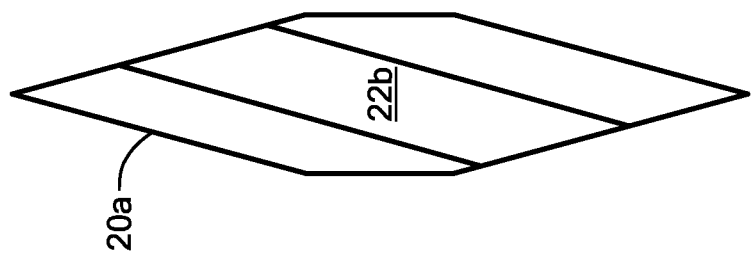
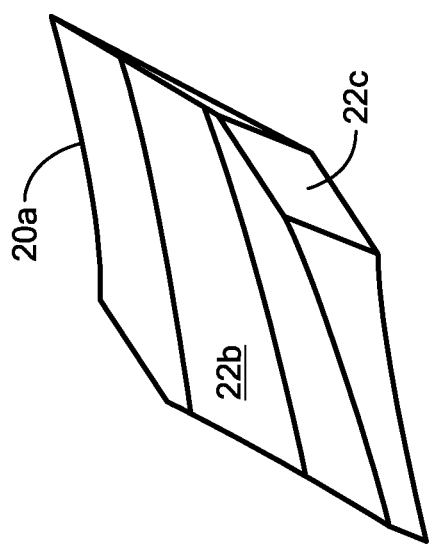
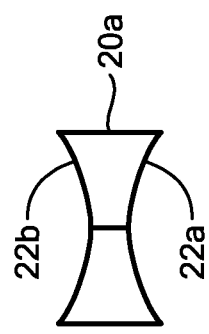
FIG. 2B
FIG. 2D
FIG. 2A
FIG. 2C

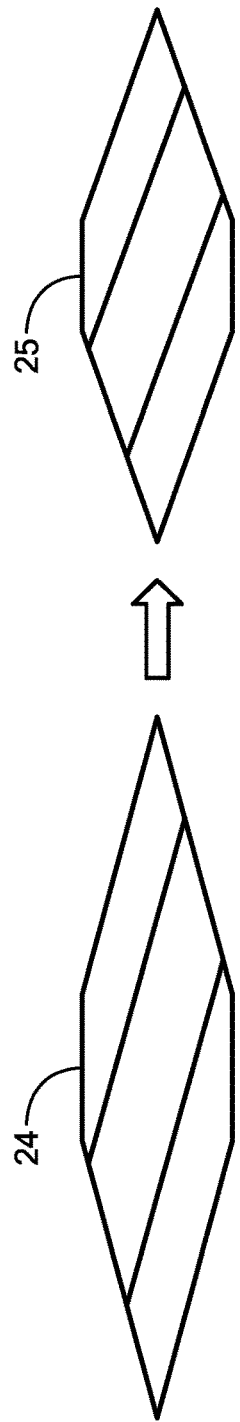
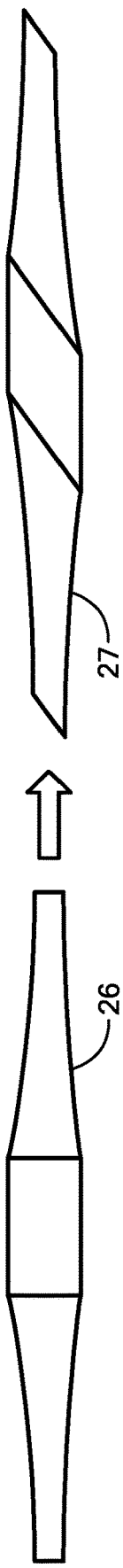
FIG. 3A  FIG. 3B  FIG. 3C  FIG. 3D

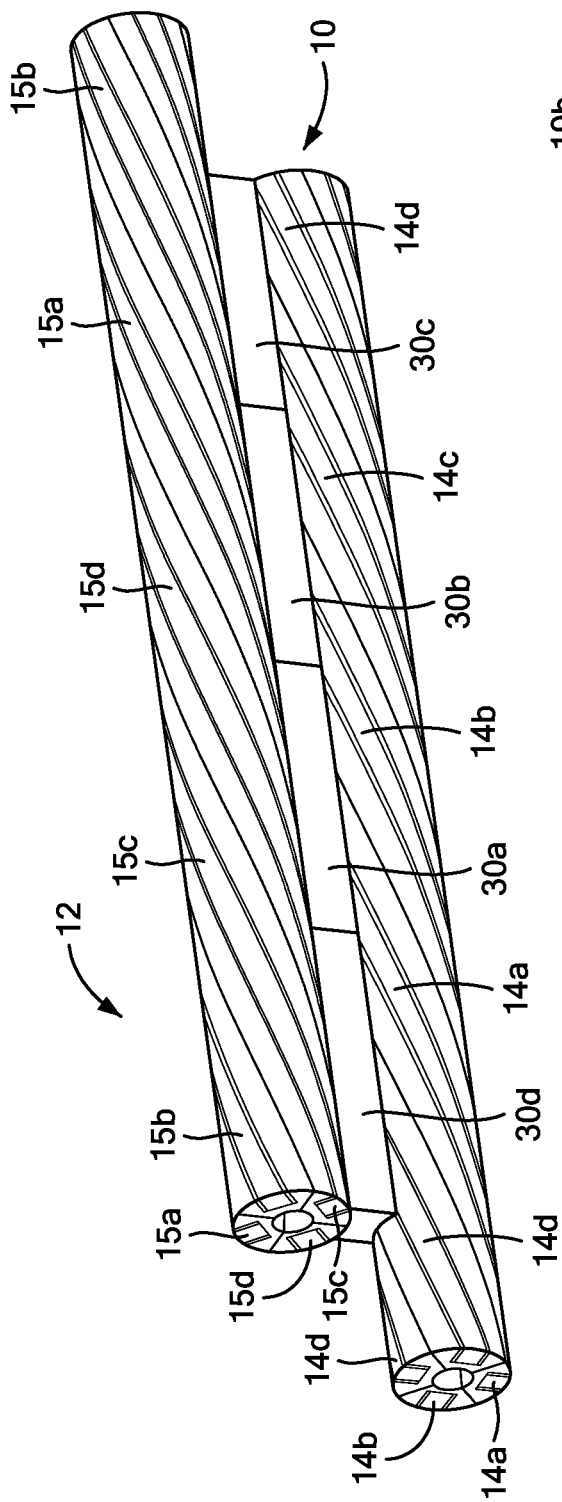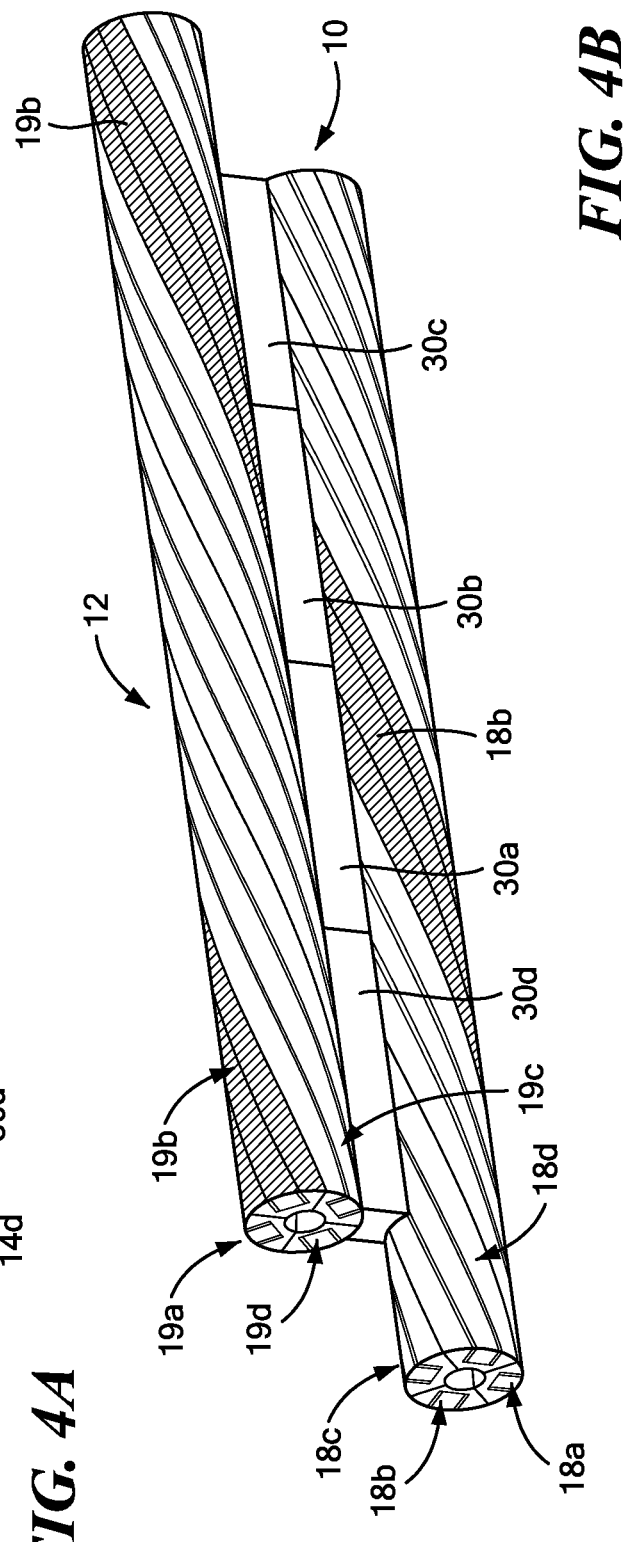

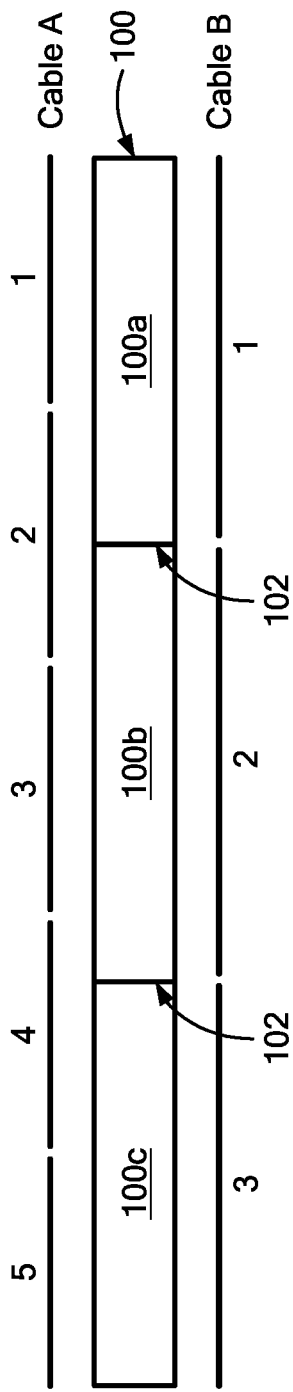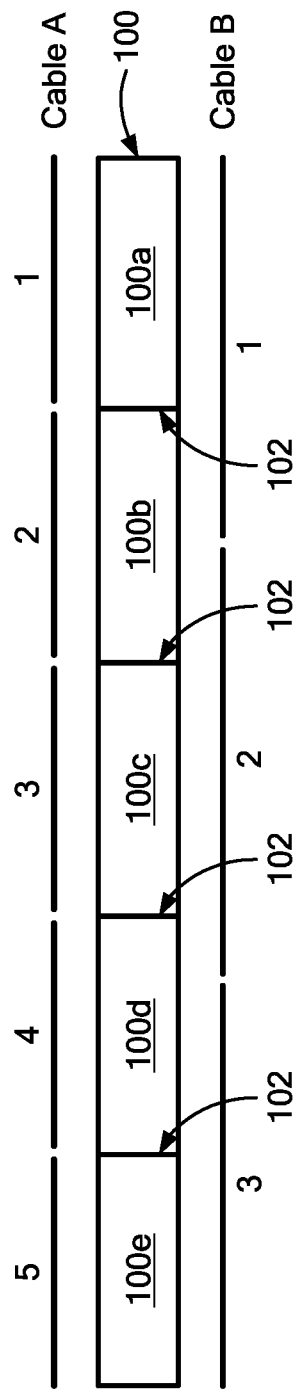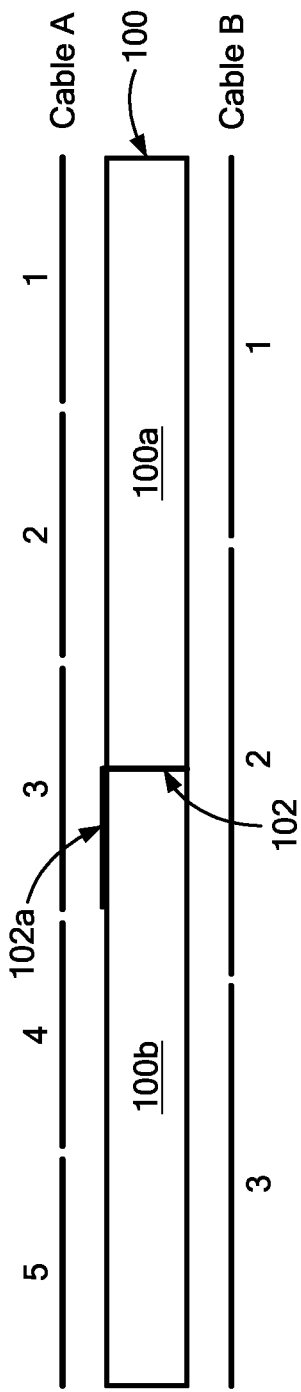

PARTITIONED CABLE JOINT FOR SUPERCONDUCTING CABLES

CROSS-REFERENCE TO RELATED APPLICATIONS

This application claims the benefit under 35 U.S.C. 119(e) of U.S. Provisional Application 63/032,277, filed May 29, 2020, which is hereby incorporated by reference in its entirety.

BACKGROUND

It is sometimes necessary to join a superconducting cable to another conductor. For example, in some applications, it may be necessary to electrically join two superconducting cables, or it may be necessary to join a superconducting cable to a normal (i.e. non-superconducting) conductor. The structure used to join a superconducting cable to another conductor is referred to as a "cable joint" or more simply a "joint."

Since when held at cryogenic temperatures, superconductors are lossless, it is favorable to utilize joints having a resistance characteristic which is as small as possible since any electrical resistance in the joint results in joule heating due to current passing through the joint from the superconductor to the other conductor. In applications in which superconducting cables carry relatively high current (e.g. superconducting cables which carry tens of kiloamps) this issue may be pronounced.

SUMMARY

In general overview, the concepts, structure and techniques described herein are directed toward an electrical interface which provides current paths into and out of a superconducting cable. In one aspect, the concepts, structure and techniques described herein are directed toward an electromechanical joint (also sometimes referred to herein as a "cable joint" or more simply a "joint") for use with high-temperature superconducting (HTS) cables in a time-varying magnetic field.

In general, it is desirable for joints in practical, superconducting cables in time-varying magnetic fields to have the following properties: low electrical resistance (in the range of 1-10 nano-ohms); high mechanical robustness (to resist large electromagnet forces during operation); high manufacturability (simple design, simple fabrication, high throughput); low production cost; and minimal area enclosed by high conductivity electrical paths, as these closed conductive loops "catch" magnetic flux and large eddy currents are induced, heating the joint.

When held at cryogenic temperatures, superconducting cables have zero resistance and thus are lossless. It is, however, sometimes necessary to have an interface between either the superconducting cable and a normal (non-superconducting) conductor (in the case of a termination to a power supply) or between two superconducting cables (for example in the case of a system which requires internal joints for fabrication). Since superconducting cables have zero electrical resistance when held at cryogenic temperatures, it is favorable to reduce the amount of resistance (R) in a joint since any electrical resistivity in the joint combined with current (I) in the joint will produce joule heating ($I^2R$) in the joint.

Current in a joint may be comprised of current passing through the joint as well as eddy currents in the joint which may be induced by changing magnetic fields. Thus, to reduce joule heating, it is desirable to reduce the amount of resistance in the joint and/or eddy currents in a joint.

In the case of superconducting cables carrying currents in the kilo-ampere range and above (e.g. cables which carry tens of kiloamps) and cables in rapidly changing magnetic fields (e.g. where the change of magnetic field vs. time (dB/dt) may be on the order of about 5 T/s), this issue may be pronounced.

Described herein are concepts, structure and techniques which satisfy the above criterion, achieve simple and manufacturable joints that achieve resistances <10 nano-ohms, greatly reduce current loops, are robust to mechanical and thermal cycling, and are demountable for reuse.

Thus, in accordance with one aspect of the concepts described herein, a partitioned cable joint comprises a plurality of distributed joint elements. At least some of the joint elements have a first mounting region having a shape selected to accept one petal of superconducting cable and a second mounting region having a shape selected to accept one petal of a second conductor. Taken together, the plurality of distributed joint elements define a joint length.

In embodiments, joint elements are provided having a size and a shape selected such that the mounting region of each joint element is configured to contact only a single petal of a partitioned, twisted high temperature superconducting (HTS) cable.

In embodiments, a dielectric material may be disposed between at least a portion of a surface of the plurality of joint elements and a portion of a surface of a cable to be joined.

In embodiments, a dielectric material disposed between the plurality of joint elements to electrically isolate each joint element from each of the other joint elements.

In embodiments, the partitioned cable joint further comprises a malleable metal disposed in a mounting surface of the first and second mounting regions of the plurality of joint elements such that in response to a cable being disposed in the mounting region, the malleable metal deforms to form a continuous, contiguous interface layer between the surface of the mounting regions and surfaces of the cables to be joined.

In embodiments, the partitioned cable joint comprises means for holding a superconducting cable in the first mounting region and for holding a second conductor in the second mounting region.

In embodiments, the plurality of joint elements have a generally diamond shape.

In embodiments, the plurality of joint elements have a generally block shape.

In embodiments, the plurality of joint elements are provided as joint blocks having a generally block shape and the dielectric material is disposed about the joint blocks to form a conductive joint block surface having a generally diamond shape.

In embodiments, the plurality of joint elements are electrically coupled with or without finite resistivity inserts between them.

In embodiments, the plurality of joint elements have a double saddle shape and the partitioned cable joint further comprises a dielectric material disposed about the joint elements.

In accordance with a further aspect of the concepts described herein, a partitioned cable joint comprises a plurality of spaced apart joint elements comprising mounting regions and a compression structure configured to compresses a first conductor into a first mounting region and a second conductor into a second mounting region.

In embodiments, the first conductor comprises a partitioned, twisted high temperature superconducting cable. In embodiments, the second conductor comprises a comprises a partitioned, twisted high temperature superconducting cable and each of the plurality of joint elements, electrically connects a single petal of the first partitioned, twisted high temperature superconducting cable to a single petal of the second partitioned, twisted high temperature superconducting cable.

In embodiments, the compression structure comprises a clamp.

In embodiments, the partitioned cable joint further includes a malleable metal between the first conductor and at least one joint element.

In embodiments, the first mounting region is shaped to conform to a shape of the first superconducting cable and the second mounting regions is shaped to conform to a shape of the second superconducting cable.

In embodiments, the plurality of joint elements have a double saddle shape.

In accordance with a still further aspect of the concepts described herein, a partitioned joint for electrically coupling a first superconducting cable having a first plurality of superconducting material segments with a second superconducting cable having a second plurality superconducting material segments, includes a plurality of joint elements, including a first joint element comprising a conductive material, the first joint element being configured to electrically interconnect a first superconducting material segment of the first plurality of superconducting material segments with a first superconducting material segment of the second plurality of superconducting material segments; and a second joint element comprising a conductive material, the second joint element being configured to electrically interconnect a second superconducting material segment of the first plurality of superconducting material segments with a second superconducting material segment of the second plurality of superconducting material segments, wherein the first joint element is electrically isolated from the second joint element.

In embodiments, the partitioned joint further comprises an electrically insulating material between the first joint element and the second joint element.

In embodiments, the first plurality of superconducting material segments comprises a plurality of high temperature superconductor (HTS) material segments. In embodiments, the plurality of HTS material segments comprises a plurality of HTS tapes. In embodiments, the first plurality of superconducting material segments are twisted about an axis of the first superconducting cable.

In embodiments, the first joint element is displaced from the second joint element along an axial direction of the first superconducting cable.

In embodiments, the first joint element has a first mounting region configured to accept the first superconducting cable and the second joint element has a second mounting region configured to accept the second superconducting cable.

In embodiments, the first mounting region has a recess to accept the first superconducting cable.

In embodiments, the partitioned joint further comprises a compression structure configured to hold the first superconducting cable in the first mounting region and the second superconducting cable in the second mounting region.

In embodiments, the plurality of joint element further comprises a third joint element comprising a conductive material, the third joint element being configured to electrically interconnect a third superconducting material segment of the first plurality of superconducting material segments with a third superconducting material segment of the second plurality of superconducting material segments.

In accordance with a still further aspect of the concepts described herein, a partitioned joint, comprises a first joint element having a first mounting region to accept a superconducting cable at a first location along the superconducting cable to electrically connect the first joint element to a first superconducting material segment of the superconducting cable; and a second joint element having a second mounting region to accept the superconducting cable at a second location along the superconducting cable to electrically connect the second joint element to a second superconducting material segment of the superconducting cable, wherein the first joint element is electrically conductive, the second joint element is electrically conductive, and the first joint element is electrically isolated from the second joint element.

In embodiments, the first superconducting material segment comprises a first high temperature superconductor material.

In embodiments, the first and second superconducting material segments are twisted about an axis of the superconducting cable.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIG. 2A is an isometric view of an example element of a partitioned cable joint;

FIG. 2B is a side view of the example partitioned cable joint element of FIG. 2A;

FIG. 2C is an end view of the example partitioned cable joint element of FIG. 2A;

FIG. 2D is a top view of the example partitioned cable joint element of FIG. 2A;

FIG. 3A is a top view of an example element of a partitioned cable joint;

FIG. 3B is a top view of another example element of a partitioned cable joint;

FIG. 3C is a side view of another example element of a partitioned cable joint;

FIG. 3D is a side view of another example element of a partitioned cable joint;

FIGS. 4A, 4B are a series of perspective views of a pair of superconducting cables coupled by a partitioned cable joint comprised of a plurality of joint blocks;

FIG. 8 is a diagram illustrating a partitioned joint coupled between two superconducting partitioned cables with each cable having a different number of partitions;

FIG. 9 is a diagram illustrating an alternate embodiment of a partitioned joint coupled between two superconducting partitioned cables with each cable having a different number of partitions; and FIG. 10 is a diagram illustrating an alternate embodiment of a partitioned joint coupled between two superconducting partitioned cables with each cable having a different number of partitions.

DETAILED DESCRIPTION

Although reference is sometimes made herein to specific cable joint configurations, it is recognized that many variations are possible. Such variations are understood to be within the scope of this disclosure. Also, reference is sometimes made herein to a particular type of superconducting cable (e.g. a particular type of superconducting cable geometry). Although reference is sometimes made to a particular superconducting cable geometry, those of ordinary skill in the art will appreciate that the partitioned joint structures and techniques described herein may find use with any type of superconducting cable including superconducting cables having any geometry or provided from any technique. After reading the disclosure provided herein, one of ordinary skill in the art will understand how to make any appropriate joint modifications needed to accommodate a particular type of superconducting cable or a particular type of superconducting cable geometry or configuration. It should be noted that in the figures the diagonal stripes on the joint elements ae merely drawing artifacts and would not appear on an actual fabricated joint element.

Figure 1A:
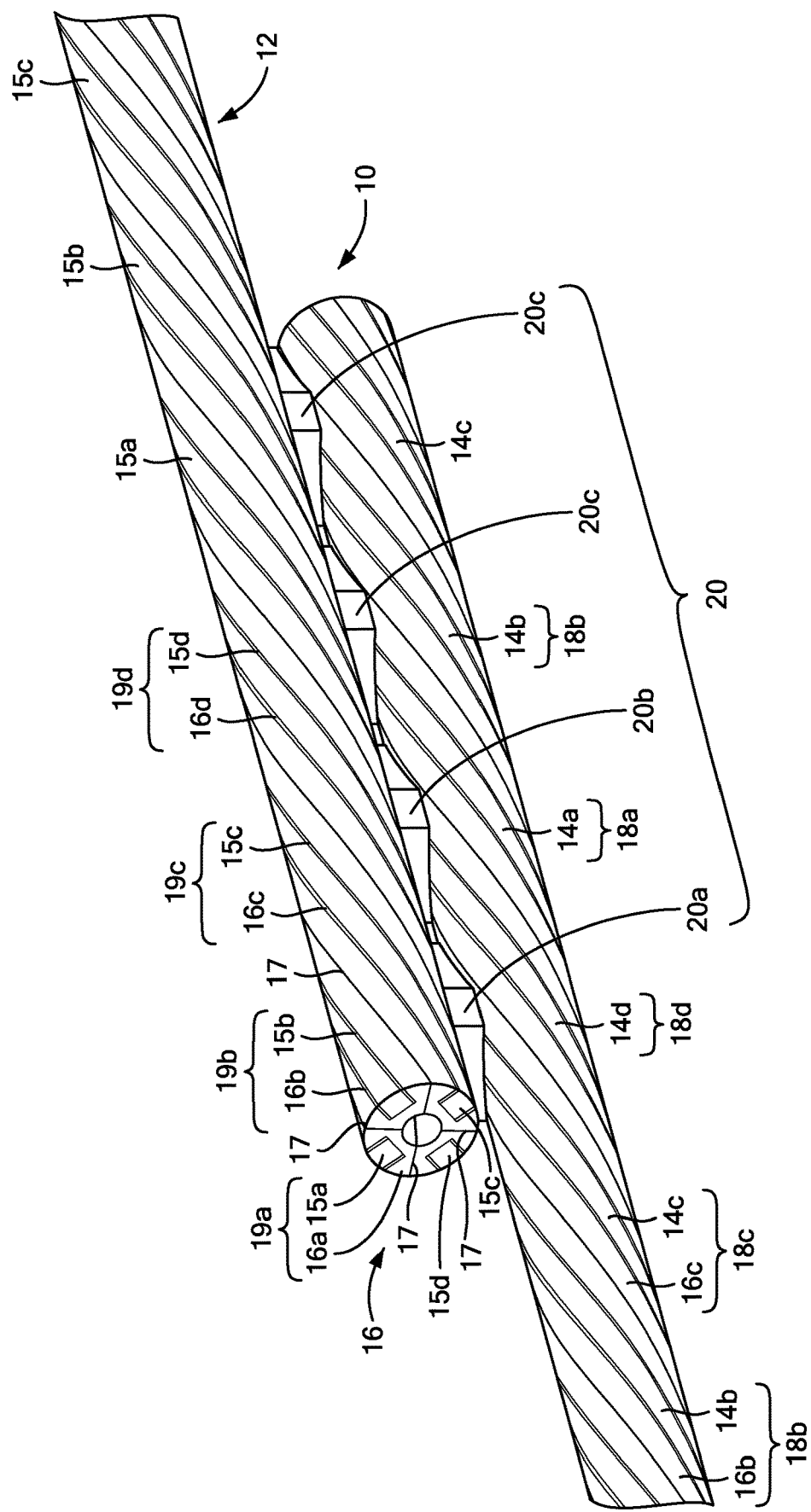
FIG. 1A is a perspective view of a pair of superconducting cables coupled by partitioned cable joint.
Figure 1B:
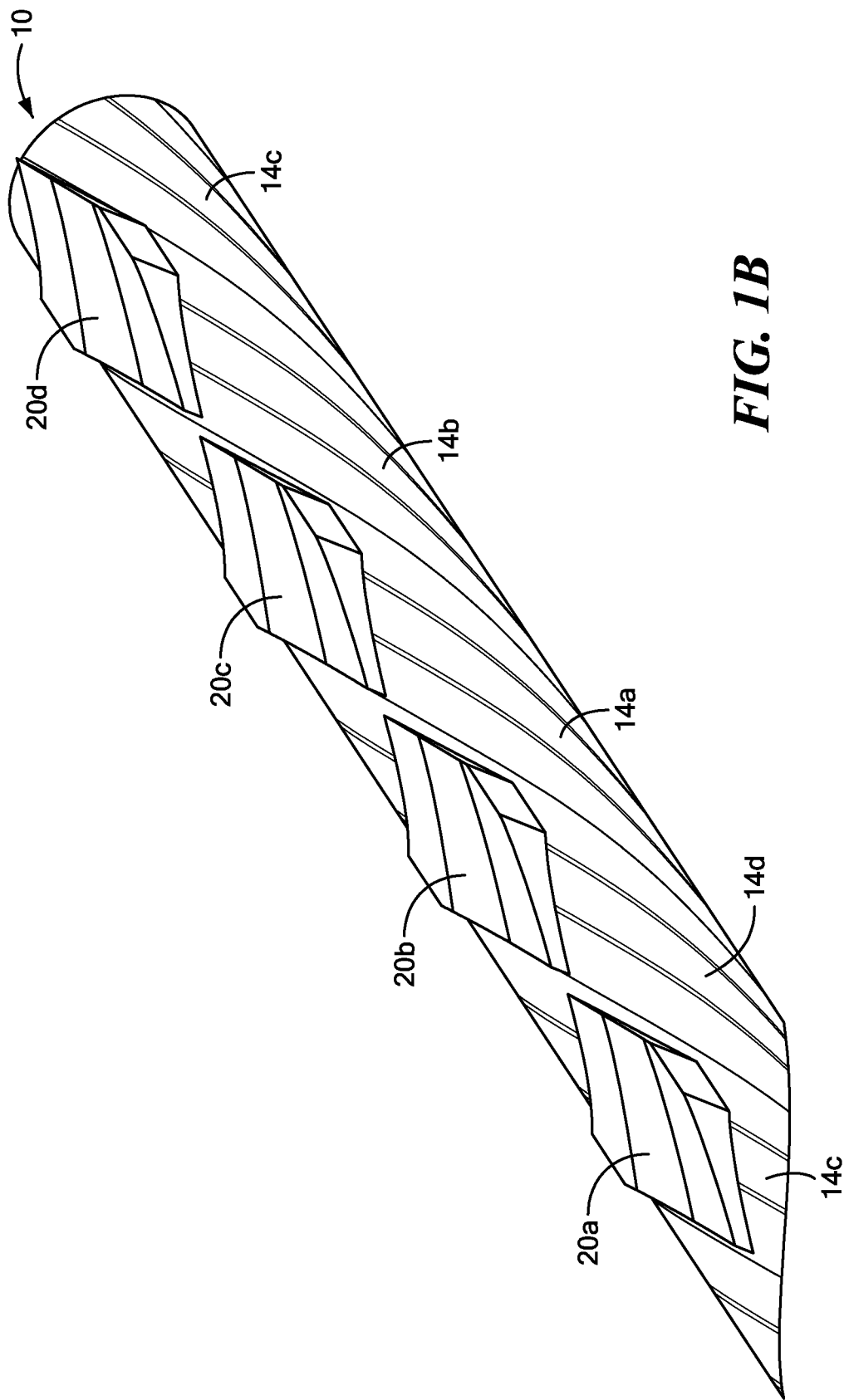
FIG. 1B is a perspective view of a superconducting cables having a partitioned cable joint coupled thereto.

Referring now to FIGS. 1A, 1B, a pair of superconducting cables 10, 12 are coupled via a partitioned (or distributed) joint 20 comprised of a plurality of partitioned (or distributed) joint elements (or joint members) 20a-20d. In some embodiments, cables 10, 12 may be high temperature superconducting (HTS) cables. In the example embodiment of FIGS. 1A, 1B cables 10, 12 comprise HTS material 14, 15. which are insulated from each other. In this example embodiment, the HTS material 14, 15 is in the form of HTS tape stacks, respectively, which are insulated from each other. As will become clear from the description provided herein below, the concepts and joint structures described herein enable joining of superconducting cables (such as HTS cables) in a series connection in a way which prevents (or at least reduces and ideally minimizes) current sharing between the HTS tape stacks. Thus, the partitioned cable joint described herein is particularly useful for connecting partitioned twisted HTS cables.

In this example embodiment, superconducting cables 10, 12 are provided as partitioned, twisted, superconducting cables 10, 12 each of which comprises a carrier (or former) 16. The carrier 16 comprises electrically conducting structures (also sometimes referred to herein as "partitions," "stabilizer structures" or more simply "stabilizers"). In this example embodiment, carrier 16 comprises four stabilizers 16a-16d with each stabilizing being electrically insulated from each other via electrically insulating material 17. Cables, 10, 12 are thus said to be partitioned. It should, of course, be appreciated that cables 10, 12 may comprise fewer or greater than four stabilizers (or stated differently, the concepts described herein may be utilized with cables have fewer or more than four partitions).

As illustrated in the example embodiment of FIG. 1A, stabilizers 16a-16d (and thus the current-carrying HTS tape stacks 14, 15) are twisted about a common axis. Each stabilizer may, for instance, follow a helical path while supporting a respective one of the current-carrying HTS tape stacks. Thus, in the example embodiment of FIG. 1A, Cables, 10, 12 are said to be twisted. Accordingly, in the example embodiment of FIG. 1A, cables 10, 12 correspond to partitioned, twisted, HTS cables.

It should, of course, be appreciated that in embodiments, a superconducting cable may comprise a plurality of stabilizers (or partitions) that support the current-carrying components that are twisted about a common axis and each of the plurality of stabilizers may, for instance, follow a helical path while supporting a current-carrying component such as an HTS tape stack.

Carrier (or former) 16 is thus partitioned so that separate segments of the former (i.e. separate ones of the stabilizers) support one or more HTS tapes and so that the separate stabilizers are electrically separated (or isolated) from one another. As illustrated in FIG. 1A, this may be accomplished via electrically insulating material disposed between the stabilizers (e.g. electrically insulating material 17). Other techniques and/or structures to insulate the stabilizers may, of course, also be used. In cases where a plurality of HTS tapes are supported by one stabilizer, the HTS tapes may be arranged in a stack, layered on top of each other along a direction that is the same as the smallest dimensional axis of the tape (e.g., tapes that are long, wide and have a small thickness are layered in the thickness direction).

In the example embodiment of FIG. 1A, each stabilizer 16a-16d has a channel or opening provided therein in which an HTS material is disposed. In the example embodiment of FIG. 1A, stabilizers of cable 10 comprise HTS material 14a-14d (e.g. an HTS tape or an HTS tape stack), respectively, and stabilizers of cable 12 comprises HTS material 15a-15, respectively. In embodiments, each tape stack comprises at least one HTS tape. In embodiments, carrier 16 may comprise a single conductor (i.e. a single stabilizer) having four channels provided therein. In embodiments, carrier 16 may comprise multiple stabilizers (here four stabilizers, 16a-16d) mechanically coupled together with each conductor having a channel provided therein. Regardless of the manner in which carrier 16 is provided, respective ones of each HTS tape stack 14a-14d, 15a-15d are disposed in respective ones of each channel. As will be appreciated from reading the description provided hereinbelow, partitioned (or distributed) joint 20 may be used to couple partitioned superconducting cables implemented in a manner and/or with a structure which is different than that of cables 10, 12.

As used herein, a combination of an HTS material (e.g. an HTS tape stack 14a-14d or 15a-15d) disposed or otherwise integrated into a stabilizer (e.g. one of stabilizers 16a-16d) is referred to as a "petal" or a "segment" generally denoted 18, 19 in respective ones of cables 10, 12. As noted above, petals are separated by insulating material (e.g. insulating material 17). Thus, in this illustrative embodiment, cables 10, 12 each comprise four (4) superconducting petals 18d-18d, 19a-19d, respectively.

Partitioned joint 20 comprises joint elements 20a-20d (also sometimes referred to as "joint partitions") disposed between cables 10, 12 such that each joint element electrically couples only a single one of the petals 18a-18d on cable 10 to a single one of the petals 19a-19d15a-15d on cable 12. In embodiments, each joint element electrically couples only a single one of the HTS tape stacks 14a-14d in cable 10 to a single one of the HTS tape stacks 15a-15d in cable 12. As noted above, each joint element 20a-20d is electrically isolated from the other joint elements and electrically isolated from other HTS tape stacks (i.e. each joint element is electrically coupled to only one HTS tape stack on each cable and is electrically isolated from other HTS tape stacks). Such a combination of joint elements is sometimes referred to herein as a "partitioned joint".

Since in this example, cables 10, 12 each have four HTS tape stacks (i.e. cables 10, 12 are so-called four-partition cables), then four joint elements may be used to couple the two cables. In general, the number of joint elements to use in an application corresponds to the number of petals (or the number of HTS tape stacks) in the cables being joined. Thus, the example embodiment of FIG. 1 shows a partitioned (or distributed) joint with single connection paths between the same partitions in two four (4) partition cables 10, 12.

In this way, each petal 18a-18d (e.g. each HTS tape stack 14a-14d) in cable 10 is physically and electrically coupled to a single corresponding one of the petals 19a-19d (e.g. a single one of the HTS tape stacks 15a-15d) in cable 12 thereby providing a 1:1 connection between petals 18 and 19 1 (and a 1:1 connection between HTS tape stacks 14, 15) of each cable 10, 12. Providing a 1:1 connection between petals (or HTS material) of a partitioned cable reduces (and ideally minimizes) eddy currents, which is important in environments having magnetics fields which change over time, in particular in environments having large changes in magnetic field strength over time (e.g., a so-called high dB/dt environment) and helps reduce (and ideally minimize) joule heating in the joint.

As may be most clearly seen in FIG. 1B, joint elements 20a-20d are disposed on respective ones of petals 18a-18d of cable 10. In embodiments, joint elements 20a-20d may comprise any conductive material including but not limited to copper. Materials having a relatively high electrical conductivity are preferred. In embodiments, joint elements 20a-20d may be provided in whole or in part from an electrically conductive material. For example, joint elements 20a-20d may comprise copper. One class of conductive materials which may be used includes oxygen free high conductivity (OFHC) copper. Joint elements 20a-20d may comprise, for example, a high conductivity copper such as C101 copper, to name one specific alloy as an example. Other materials having electrical and mechanical/structural characteristics which are the same as or similar to the electrical and mechanical/structural characteristics of C101 copper may, of course, also be used including, but not limited to, alloyed coppers (for example: bronze, copper doped with silver, etc.). Other alloys (including other copper alloys) could, of course, also be used. In some applications, a tradeoff between material strength and material conductivity may be made in selecting a material. For example, in some applications it may be desirable to select a material (e.g. a copper alloy) which provides higher strength but at the expense of conductivity while in other applications it may be desirable to select a material which provides higher conductivity but at the expense of strength. Thus, when selecting a material from which to provide a joint element for use in a particular application, a trade-off may be made between material characteristics (e.g., between conductivity and strength characteristics in this example). After reading the disclosure provided herein, one of ordinary skill in the art will understand how to select a particular material (or materials) from which to provide joint elements 20a-20d for a particular application.

In embodiments, the joint members and/or the petals may be plated with a conductive material (e.g. copper, silver, alloys, or any other appropriately selected plating material). In embodiments, in which petals are exposed after removing an outer jacket of a cable, it may be desirable to sand (or otherwise treat) an exterior surface to expose the former (assuming the former is provided from a material which can be plated—e.g, copper) such that the former can thereafter be plated (e.g. using a silver plate). It should, of course, be appreciated that in some embodiments, it may not be possible plate the solder above the HTS stacks.

In embodiments, the joint members may be impregnated or co-wound with HTS tape or even bulk superconductors. Such an approach may be desirable, for example, in applications which utilize persistent magnets such as magnetic resonance imaging (MRI) or nuclear magnetic imaging (NMI), in which joint resistance may be an important factor.

Significantly, and as can also be clearly seen in FIG. 1A, the joint elements 20a-20d are physically spaced apart from each such other (i.e. joint elements 20a-20d do not touch) and each joint element 20a-20d is in physical contact with only a single petal (and in some embodiments, in physical contact with only a single HTS tape stack). Hence, in this embodiment, the partitions between the joint elements are provided by physically spacing the joint elements (with air or other electrically insulating material existing between the joint elements) to thus provide the portioned joint. In this way, a 1:1 connection between superconducting material 14a-14d, 15a-15d of each cable 10, 12 (via joint elements 20a-20d) may be ensured. In embodiments, the joint partitions 20a-20d may be coupled, secured, fastened or otherwise attached to the cables 10, 12 using any removable, permanent, or semi-permanent means. For example, joint partitions 20a-20d may be secured to the cables 10, 12 via tape, epoxy, or solder while the joint is assembled. Then, compression pressure from a surrounding case, fixture or clamp structure (examples of which are illustrated in FIGS. 7A-9B and 10C) keeps the joint partitions 20a-20d secured to the cables 10, 12 thereafter.

In an alternate embodiment (to be described in detail below in conjunction with FIG. 6), the 1:1 connection between the cables (via joint elements 20a-20d) may also be ensured via the use and appropriate arrangement of an insulating material.

Referring now to FIGS. 2A-2D which like elements of FIGS. 1A, 1B are provided having like reference designations throughout the several views, and taking joint element 20a, as representative of joint elements 20b-20d, joint element 20a is provided having a shape which allows arrangement of the joint element 20a on a cable in a manner in which the joint element stays physically spaced from other joint elements and is electrically coupled to a single petal or a single HTS tape stack of cables 10, 12. In the example embodiment of FIGS. 1-2D, joint element 20a has a generally diamond shape with two curved surfaces 22a, 22b having radii selected to mate with the radii of respective surfaces of the cables 10, 12. Other shapes may of course, also be used as long the joint element is configured to be physically spaced from other joint elements and is configured to be electrically coupled to a single HTS tape stack of cables 10, 12. Thus, joint elements are provided having shapes which enable electrically coupling between HTS material and/or petals of cables to be joined. In some embodiments, two cables of different diameters can be connected, in which case the surfaces of the joint elements can have different radii on the sides, mating with the cables.

For example, and referring now to FIGS. 3A-3D, various (relative) sizes and shapes of joint elements 24-27 are shown. Such variants may be useful, for example, if cables to be joined are offset axially from each other. In the example of FIG. 1A, a central longitudinal axis of cable 10 is aligned with a central longitudinal axis of cable 12 (or stated differently, cables 10, 12 are axially aligned). However, when joining axially offset cables, a smaller overlapping region may exist and thus, a concomitantly smaller joint element (e.g. see the illustrative embodiment of FIG. 3B relative to the illustrative embodiment of FIG. 3A) may be used since the area contacting the petals of each cable is smaller. Alternatively, a conductive joint element (e.g. joint element 26 in FIG. 3C) may be cut or skewed diagonally (or otherwise formed) so that the joint element takes on a parallelogram-like the shape (see joint element 27 in FIG. 3D). The particular size and shape of any joint element of a partitioned joint (including joint elements to be described below in conjunction with FIGS. 4A-7A) may be selected in accordance with a variety of factors including, but not limited to: the size, shape, configuration and orientation of the cables to be joined as well as the relative position of a central longitudinal axis of each cable to be joined. As noted above, in some embodiments, it may be desirable to couple two cables having different diameters. In this case, the surfaces of the joint elements can have different radii with the radii of each surface selected to mate with respective surfaces of the cables.

Referring now to FIGS. 4A-6C in which like elements are provided having like reference designations, cables 10, 12 are coupled via a distributed or partitioned joint comprising a plurality of joint elements. In this example embodiment, the joint elements are provided as a plurality of joint blocks 30a-30d. The joint blocks may be provided from any of the electrically conductive materials described above. In some embodiments a high conductivity material which is relatively soft compared with the joint elements and cable material can be disposed between the joint elements and the cable to reduce the contact resistance. This material can be indium or copper mesh or a combination thereof.

Figure 6A:
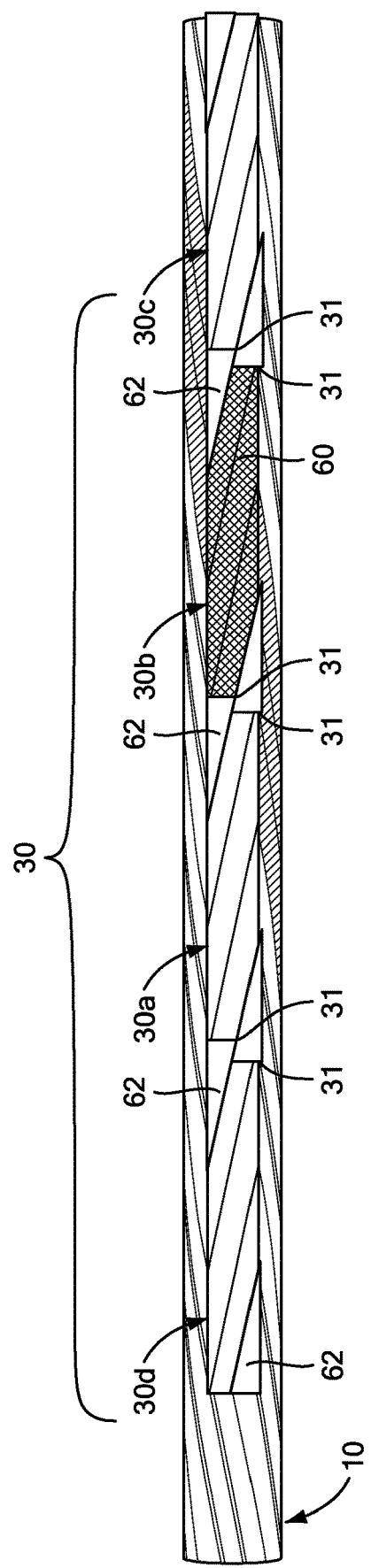
FIG. 6A is a top view of a superconducting cable having both a partitioned cable joint comprised of a plurality of joint blocks and a dielectric material disposed thereon.

As may be most clearly seen in FIG. 6A, a dielectric materiel 62 is disposed between the superconducting cable and portions of the joint blocks. The dielectric materiel is arranged to insulate the superconducting cable such that only one petal per cable is electrically connected to a given joint block. Additionally, each joint block is insulated from the other by the dielectric material (hence, in this embodiment, the partitions are provided (or formed) by a dielectric material disposed between the joint elements to provide the partitioned joint). In embodiments the dielectric may be provide as a polyimide material (e.g. a polyimide film such as Kapton® or a polyimide tape) or as a polytetrafluoroethylene (PTFE) material. In embodiments, other dielectric or electrically insulating materials may be used. In some embodiments (e.g. the embodiment of FIG. 6A) an alumina plasma spray may be used. In embodiments, the insulating material may be in a form of an adhesive tape glued or otherwise secured to the joint element or the cable. Alternatively, the insulating material may be in a form of paste (e.g. Apiezon M), or a spray (e.g. Teflon®) applied to one or both mating surfaces.

As illustrated in FIG. 4B, petals 18b, 19b (in respective ones of cables 10, 12) have a current path between them (i.e. current flows between petals 18b, 19b). They do not share current with any other petal (i.e. petals 18b, 19b are electrically coupled to each other and not to any other petal). Thus, in this embodiment, each petal from cable 10 is connected to exactly one other petal from cable 12 through one insulated joint block in the partitioned joint.

Referring briefly to FIGS. 5A-5D, and taking joint element 30a as representative of joint elements 30b-30d, joint element 30a is provided having a shape which allows arrangement of the joint block 30a on a cable in a manner in which the joint block either stays physically spaced from other joint blocks or are electrically insulated from other joint blocks via a dielectric material, for example. The joint block is electrically coupled to a single petal or a single HTS tape stack of each of cables 10, 12. In the example embodiment of FIGS. 4A-6C, joint block 30a has a generally block shape with two curved surfaces (or cable mounting regions) 32a, 32b having radii selected such that the curved surfaces of the joint block mate with the radii of surfaces of the cables 10, 12. Other shapes (i.e. shapes other than curved shapes) may of course, also be used as long the joint block is configured to be physically spaced from other joint elements and is configured to be connected to a single petal or single HTS tape stack of cables 10, 12.

In some embodiments, joint elements can be electrically connected to each other by inserts comprised of finite resistivity materials. Resistance between the joint elements can be adjusted by varying the electrical resistivity of the material of the insert and its thickness. The first purpose of this adjustment is to reduce electrical coupling between the petals to reduce the eddy current losses. The second purpose of these inserts is to provide an opportunity for limited current sharing between the petals in case of poor electrical contact in current paths of one or more consecutively connected petals Although mounting regions 32a, 32b are herein shown on opposing surfaces of joint block 30a with central longitudinal axes thereof aligned, those of ordinary skill in the art will appreciate that mounting regions 32a, 32b can be oriented in positions different from the position illustrated in FIGS. 4A-5D. That is, it should be appreciated that one or more mounting regions may be provided on one or more of top, bottom, end or side surfaces of a joint element. As noted above, the particular shape of a joint element (e.g. such a diamond shape, block shape, etc.) is selected to suit the needs of the particular application and likewise, the particular size, shape, orientation and location of a mounting region on a joint element is selected to suit the needs of the particular application. For example, in embodiments, it may be desirable, or even necessary, to provide a joint block having a shape such that mounting regions 32a, 32b are on opposite surfaces but offset from each other (i.e. the central longitudinal axes thereof are not aligned as illustrated in FIGS. 4A, 4B). Or mounting regions 32a, 32b may be provided at an angle with respect to each other. Other variants are also possible. For example, the mounting regions may be on the same surface of a conductive member (e.g. the mounting regions may be side-by-side on the same surface of the joint block).

Thus, in embodiments, the cables need not be axially symmetrical. In embodiments, the cables may be oriented axially in either direction. In the illustrative embodiment of FIG. 1, a so-called "shaking hands" configuration is shown, but flipping one cable (e.g. cable 12) 180 degrees with respect to a second cable (e.g. cable 10) results in a joint having a so-called "praying hands". In short, the mounting regions 32a, 32b may be oriented in any manner to accept cables oriented anywhere between 0 and 180 degrees with respect to each (e.g. a central longitudinal axes of each cable may be oriented anywhere between 0 and 180 degrees with respect to each other). Furthermore, it is appreciated that mounting regions 32a, 32b (and thus joint block 30a) may be configured to accept cables which are not straight. That is, the cables and mounting surfaces of joint blocks 30a-30d could follow a curved path or an irregularly shaped path along a length thereof.

Figure 5A:
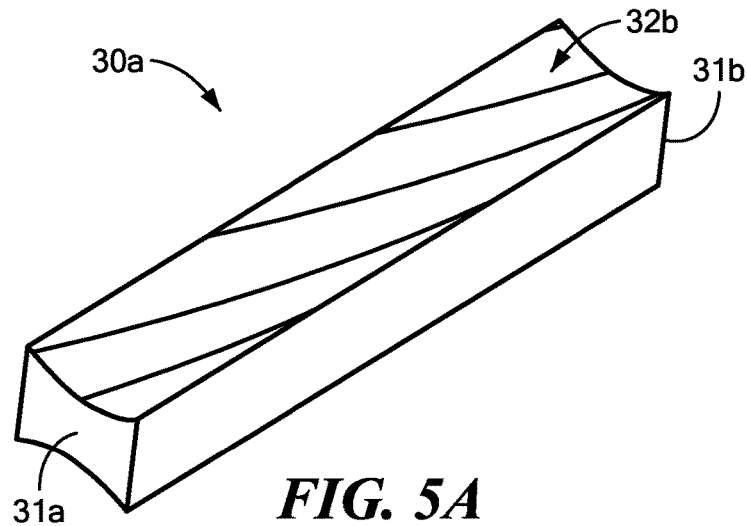
FIG. 5A is a isometric view of a joint block of an example partitioned cable joint.
Figure 5B:
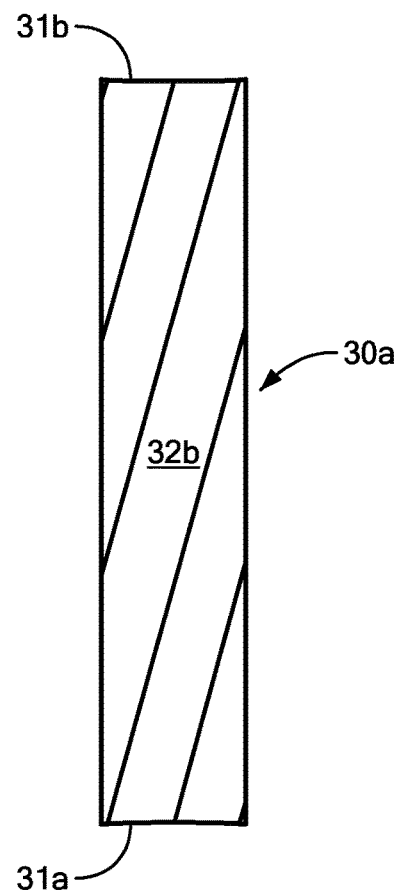
FIG. 5B is a top view of the example partitioned cable joint element of FIG. 5A.
Figure 5C:
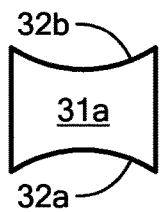
FIG. 5C is an end view of the example partitioned cable joint element of FIG. 5A.
Figure 5D:
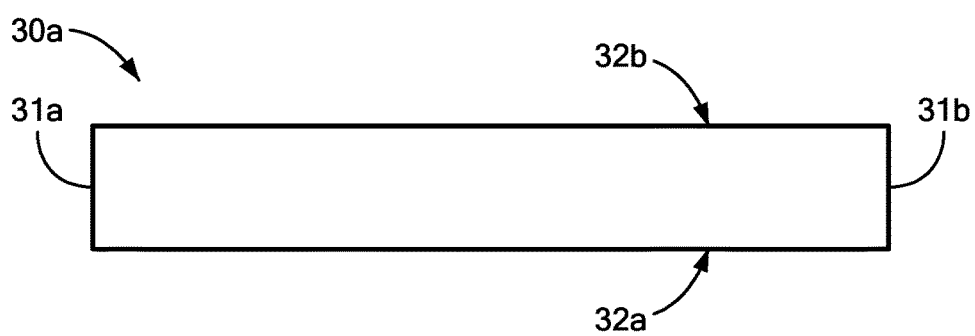
FIG. 5D is a side view of the example partitioned cable joint element of FIG. 5A.

As may be most clearly seen from FIGS. 5A and 5C, cable mounting regions 32a, 32b have curved mounting surfaces to thus provide the joint block having a so-called "double-saddle" shape. Thus, the joint block may sometimes be referred to as a "saddle member" or a "saddle piece".

Figure 7A:
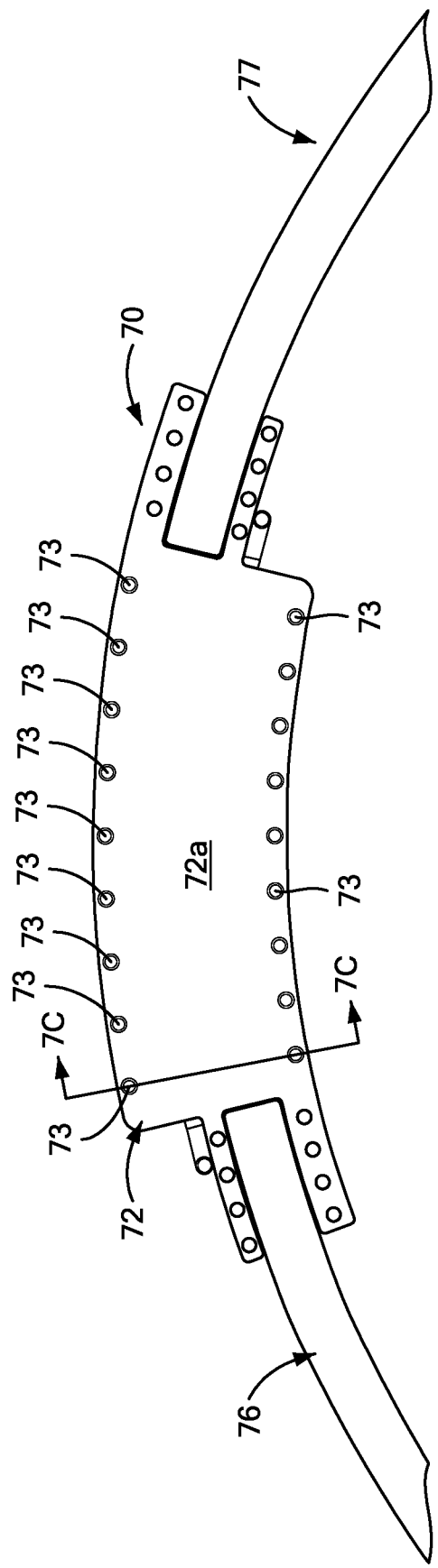
FIGS. 7A, 7B are top views of a curved joint.
Figure 7B:
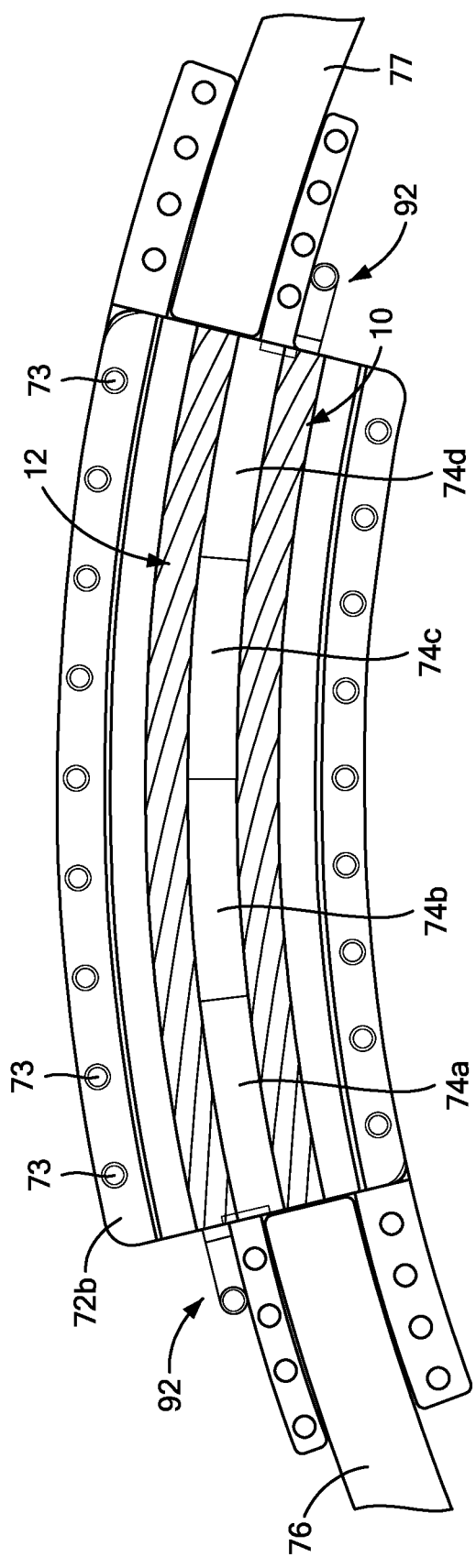

At least the particular cross-sectional shape, length, and configuration (e.g. path along the mounting region length) of mounting regions are selected to match the shape of a conductor (e.g. conductors 10, 12) with which joint block is intended to interface. Thus, while in this example, mounting regions of joint blocks 30a-30d are straight (i.e. a straight path along its length) and thus are intended to interface with straight conductors 10, 12 having a generally circular, or semi-circular, cross-sectional shape, it should be appreciated that the joint block mounting regions may be provided having any regular or any irregular geometric shape selected to substantially match a cross-sectional shape and path length shaped of a conductor to be coupled thereto. In embodiments, the partitioned joint (and possibly one or more of the joint members comprising a partitioned joint) may be curved along its length (e.g. swept through an arc as shown in FIGS. 7A, 7B) as opposed to being straight along its length (as shown in FIGS. 4A, 4B).

For example, one or both of the mounting regions 32a, 32b may be provided having a rectangular cross-sectional shape, a square cross-sectional shape, an oval cross-sectional shape or a multi-faceted cross-sectional shape. Other geometric shapes are also possible. Also, it should be appreciated that each mounting region need not be provided having the same cross-sectional shape (i.e. each mounting region may be provided having a different cross-sectional shape so as to join, for example, cables having different cross-sectional shapes). For example, one mounting region, may have a curved mounting surface as shown in FIG. 4A (so as to accept a cable such as that shown in FIGS. 4A, 4B), while a second mounting region may have a flat mounting surface so as to accept a conductor having a flat surface (e.g. such as a bus bar having a rectangular cross-sectional shape).

In the embodiment of FIGS. 4A-6C, an electrically insulating material such as a dielectric such as Kapton, for example, may be disposed between cables 10, 12 and joint blocks 30a-30d so that only one petal per cable is electrically connected to a given joint block. Additionally, each joint block is insulated from the other by a dielectric material.

Referring now to FIG. 6A, a top view of the superconducting cables 10, 12 of FIG. 4A with the top cable 10 removed, reveals the partitioned cable joint 30 comprised of a plurality of joint blocks 30a-30c disposed on superconducting cable 12 as well as a dielectric materiel 62 disposed between the superconducting cable and the joint blocks. The dielectric materiel is arranged such that only one petal per superconducting cable is electrically connected to a given joint block. In the example of FIG. 6A, the dielectric materiel is arranged such that the joint blocks mimic a generally diamond shape (e.g. as illustrated in FIGS. 1A-3D, 6C). Additionally, each joint block is insulated from the others by physical spacing (e.g., a gap between ends 31 of the joint elements 30a-30d which face each other) as well as the dielectric material.

Dielectric 62 is disposed between bottom surfaces of joint blocks and surfaces of the cables 10. A similar dielectric is disposed between the top surfaces of joint blocks and surfaces of the cable 12. Thus, dielectric is disposed between both cables and the partitioned joint. Portions 60 of each joint block 30a-30D are not blocked by dielectric 62 and thus are exposed to cable 12 (not visible in FIG. 6A) such that portions 60 electrically connect to exactly one petal of the top cable 12. The bottom of each block (not visible in FIG. 6A) also has portions 60 which electrically connects exactly to one petal from the bottom cable 10. In embodiments, the dielectric material may be applied to the joint blocks. In embodiments, the dielectric material may be applied to the cables. With this approach, the dielectric may be accurately placed on petals of the cables.

Figure 6B:
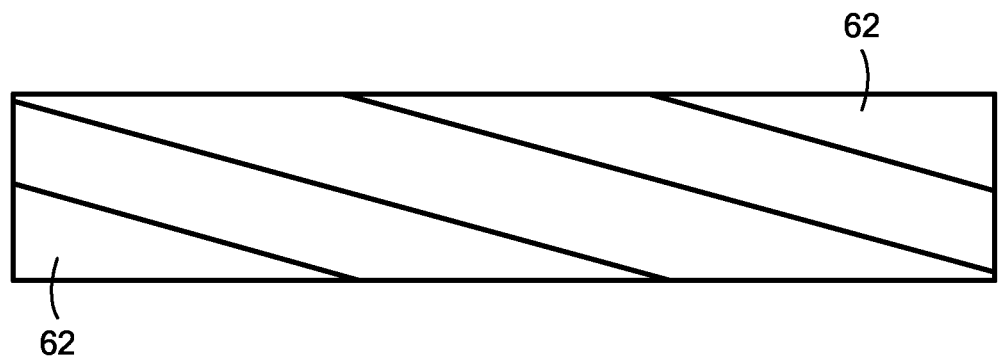
FIG. 6B is a top view of a joint block and a dielectric material.
Figure 6C:
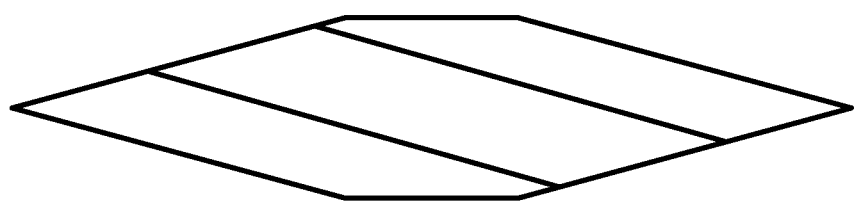
FIG. 6C is a top view of a joint element having a truncated diamond shape.

FIG. 6B illustrates arranging a dielectric material around a rectangular shaped joint block 30a to create a joint element having a generally diamond shape (or an elongated version of a regular hexagon) such as the joint element of FIG. 6C.

The dielectric is placed between the joint block and the cables to be joined (e.g. cables 10, 12 in FIG. 4A), effectively creating a desired shape (here, a generally diamond shape) but without having to cut, machine or otherwise fabricate a shaped conductive piece for each joint element of the partitioned joint. Rather, the dielectric is cut or formed for each joint, which is much easier and quicker than cutting, machining or other fabricating a metal block into a particular shape. A dielectric may also be applied to the ends of the copper to insulate blocks from each other (see FIGS. 4A, 4B, 6A).

It should be appreciated that the partitioned joint structures and techniques described herein may be used to join cables having opposite twist directions. In this case, the joint elements would have a shape which is generally the shape of a parallelogram.

Figure 7C:
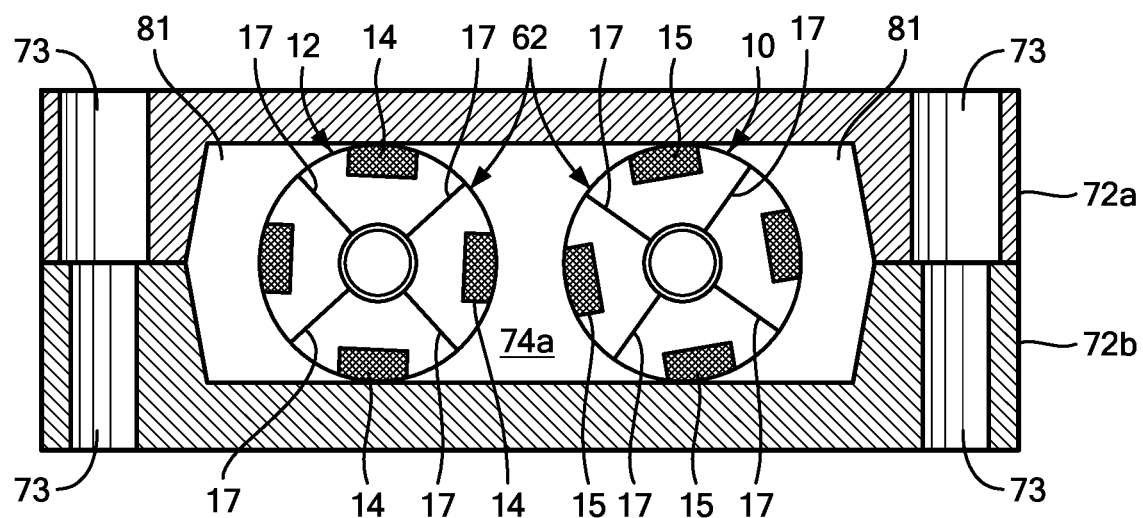
FIG. 7C is a cross-sectional view taken along lines 7C-7C in FIG. 7A.

Referring now to FIGS. 7A-7C a joint 70, which couples a pair of superconducting cables 10, 12, includes a curved joint case or housing (or more generally a curved joining member) 72 comprising upper and lower covers (or brackets) 72a, 72b and a curved partitioned joint 74 comprising a plurality of curved joint blocks 74a-74d (FIG. 7B). In FIG. 7B, cover 72a of curved joint case 72 has been removed to reveal curved partitioned joint 74 coupled to first and second superconducting cables 10, 12 along a radius. In embodiments in which joint case 72 comprises first and second parts, the first and second parts are secured by fasteners (e.g. screws, nuts and bolts, rivets or other types of fasteners) disposed through holes 73 in the upper and lower covers. In some embodiments, some of holes 73 may be threaded (partially or fully threaded).

Curved joint 70 maintains continuity of the conductors 10, 12 while reducing (and ideally minimizing) overall footprint. This means each unique radii in a system may have a new housing 72 having the requisite radius.

Cable jackets (or conduits) 76, 77 are disposed about the petals of respective ones of petals od cables 10, 12 to structurally support the cables and to which blocks in FIG. 9 are welded. Portions of cable jackets 76, 77 are removed in the joint region to thereby expose the petals for contact with appropriately shaped joint elements (e.g. the saddle-shaped joint elements 74a-74d). In this example embodiment, the cable jacket may be provided having a square cross-sectional shape (such that the cable is provided having a so-called "circle in square" configuration). In embodiments, the jackets 76, 77 comprises steel. Referring now to FIG. 7C, superconducting cables 10, 12 may be secured via a nut and bolt (not shown in FIG. 7C) disposed in through holes 73, 73 in respective upper and lower covers 72a, 72b to form a clamping structure. In embodiments, other joining structures may, of course be used. For example, screws which coupled to threaded bores in the covers may be used. Alternatively, the joining means may comprise spring-type structures. Alternatively still, in embodiments, a permanent coupling means (e.g. a welded structure) may be used to secure the superconducting cables to the partitioned cable joint and/or may be used to secure cables within a joint case. In embodiments, securing structures 81 help secure the cable within the joint case 72.

In embodiments, covers 72a, 72b may be provided as stainless-steel covers. In embodiments in which the two HTS cables are compressed into a partitioned cable joint, any clamping or holding structure capable of providing up to 40 MPa of pressure to ensure mechanical contact between the cables and the partitioned cable joint may be used. The particular manner in which the joining means are implemented is not important as long as the joining means provide enough force to securely hold cables 10, 12 to the partitioned cable joint 74.

In embodiments, disposed on conductive mounting surfaces of the mounting regions in each joint element is a malleable conductive material 62. In embodiments, the conductive material may be spread or otherwise disposed on conductive surfaces of the mating surface of each joint element (and ideally all conductive surfaces of the mating surface of each joint element) and preferable does not contact the insulating material. In embodiments, the conductive material may comprise an electrically conductive metal configured as strips or lines disposed in mounting surfaces. In embodiments, the malleable conductive material may comprise indium. In embodiments, indium may be placed or otherwise disposed on the mounting surfaces. In embodiments, on or more indium wires may be used. In embodiments, a substantially pure indium wire may be used. When an indium wire is used the wire is spaced wires such that the wires can be deformed to form a conductive layer upon insertion of a cable in the mounting region. It should be noted that the conductive material can be placed in any orientation (i.e. lengthwise or crosswise or at any angle) within mounting regions. As noted above, in embodiments, a copper wire mesh may be combined with indium to form the conductive layer. In general, the conductive layer enhances the electrical contact between the mounting surfaces of the joint elements and corresponding petals of the cables to be joined.

In embodiments, the wire may be wrapped around each conductor (e.g. spiral wrapped around each conductor such as cables 10, 12 and then placed in mounting regions of the partitioned joint. Upon placement of the respective cables in the mounting regions, the conductive material deforms to provide an electrically conductive layer (and ideally a conductive layer having a substantially uniform thickness). This technique holds or otherwise secures the indium in place during assembly and excess indium (i.e. those portions of the indium which are not disposed between a surface of the cable and partitioned joint mounting surfaces is removed.

In embodiments, the conductive material may be provided as a soft metal. For example, a metal having a malleable characteristic at room temperature (e.g. temperatures in the range of about 55 F to about 90 F) may be used. The purpose here is that the "soft metal" should be able to be handled, molded, and then squeezed tightly between the two surfaces (i.e. a surface of the conductor to be joined and mounting surfaces) to form a continuous surface, preferably without a heat treatment process. Conductive material may be disposed on mounting surfaces or on conductors 10, 12 such that when conductors 10, 12 are disposed in respective ones of the mounting regions, the conductive material is disposed between a surface of the conductor (e.g. an HTS cable) and a surface of the mounting regions.

In embodiments, a metal capable of deforming to provide a substantially uniform metal layer (and ideally a highly uniform metal layer) on a mounting surface of the mounting region is preferred. Such a substantially uniform deformation and resulting layer results in a substantially uniform contact between a surface of a conductor disposed in the mounting region and a surface of the mounting region. It should, however, be appreciated that in embodiments a substantially uniform layer thickness is not necessarily needed since total joint resistance does not directly depend greatly upon the thickness or the layer.

In embodiments in which wires are used, it is desirable that all of the wires (e.g. indium wires) deform in a manner which results in no gaps between the deformed wires (i.e. after wire deformation, the resulting metal should be contiguous and ideally cover the entire mounting surfaces). Thus, it is desirable to have a continuous, uninterrupted sheet or interface layer of a conductive material (e.g. indium) at the end of the process to ensure a large (and ideally the largest) contact area between a surfaces of the conductor 10, 12 and mounting surfaces of the partitioned joint.

The particular amount of pressure to use to deform the conductive materials depends upon a variety of factors including, but not limited to the materials from which the cable, saddle member and conductive material are provided in addition to the size (e.g. diameter, cross-sectional area, etc. . . . ) and configuration of the conductors being joined. In embodiments 30 MPa of contact pressure is desired to compress indium 62 disposed between surfaces of the cables and mounting regions of the partitioned cable joint 30 so form good electrical connection.

The conductive metal may be provided having any shape. For example, as noted above, conductive metal may be provided as one or more wires. The wires may be provided having any regular or irregular cross-sectional shape including, but not limited to oval, circular, rectangular, square, triangular or any other cross-sectional shape. Alternatively, conductive metal may be provided in the form of (or as a type of) a conductive paste or a conductive liquid metal. The particular type and shape of conductive metal to use is selected such that a substantially contiguous and substantially continuous contact layer exists between the conductor (e.g. one of cables 10, 12) and mounting surfaces of the partitioned joint.

A metal which deforms to provide a contact layer results in a low resistivity path between the cable and partitioned joint. In principle, resistance of the joint will decrease approximately linearly with the available area through which the current can flow. Thus, it is desirable to cover as much of the mounting region surface area which will be in contact with the conductor to be joined as is practically possible. Ideally, once the cable to be joined is disposed in the mounting region, the interface layer covers the entire surface area of the mounting region.

In embodiments, conductive metal could be disposed or applied (or spread) over the mounting surface of the cable rather than the mounting surfaces of the partitioned joint. In embodiments, conductive metal could be disposed or applied (or spread) over portions of both the mounting surface of the cable and the mounting surfaces of the conductive member (e.g. the saddle member). In embodiments, it may be necessary to heat the cable and/or the mounting surface to promote or facilitate the deformation characteristic of the metal which forms the conductive interface layer.

Figure 7D:
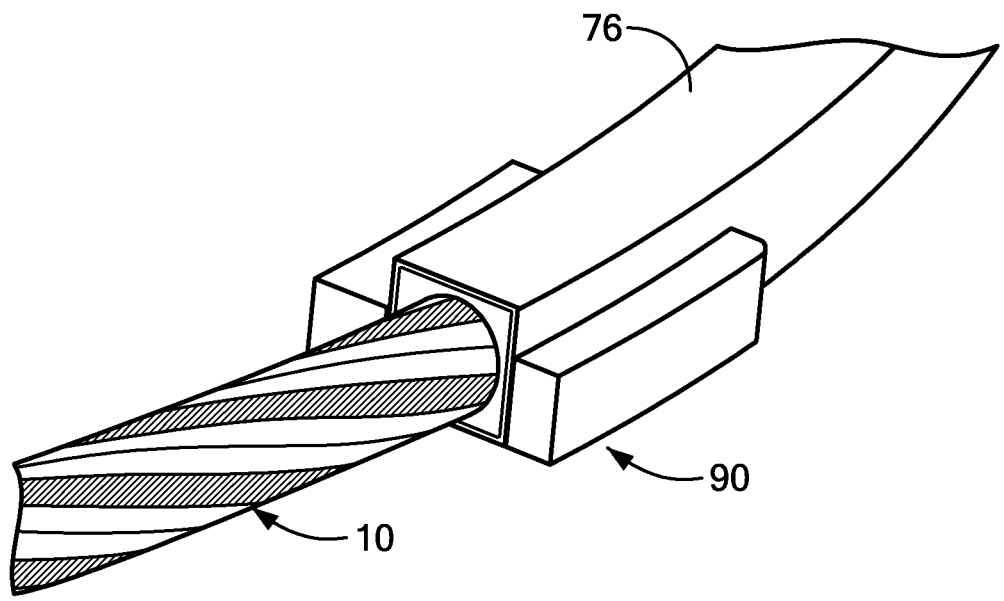
FIGS. 7D, 7E are perspective views of portions of the joint shown in FIG. 7A illustrating terminal blocks secured to a superconducting cable (FIG. 7D) and a joint housing (FIG. 7E)
Figure 7E:
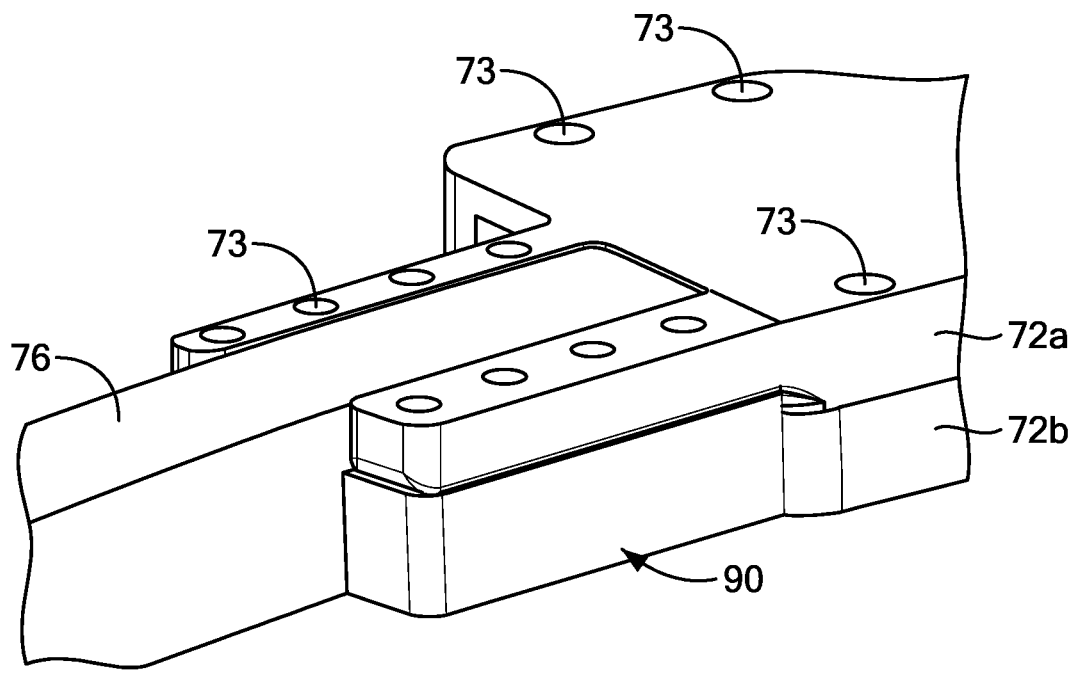

FIGS. 7D, 7E are perspective views of portions of the joint 70 shown in FIG. 7A. In embodiments, terminal blocks 90 may be welded or otherwise secured to a jacket of the superconducting cable. Attachment bosses may be secured (e.g. welded to the superconducting cable) during jacket manufacture. A housing may be bolted or otherwise secured to the joint housing to secure cable jackets through mounting bosses. In embodiments, it may be necessary to optimize case shape/stiffness relative to jacket stiffness to minimize stresses during electromagnetic (EM) loading.

In FIG. 7D portions of jacket 76 have been removed to expose a portion of cable 10. The exposed portion of cable 10 will be placed in contact with the partitioned joint (e.g. joint blocks 74a-74d in FIG. 7B). A mounting structure 90 also referred to as a terminal block 90 (here shown as a U-shaped block or U-shaped channel beam) is secured to steel jacket 76. In embodiments, mounting structure 90 may be welded to directly to jacket 76. In embodiments, after securing mounting structure 90 to jacket 76, an electrically insulating material may be disposed over portions of steel jacket 76. The joint housing is then secured to the mounting structure 90. In this example embodiment, top housing 72a is secured to mounting structure via one or more fasteners (e.g. bolts) passed through top housing holes 73 to holes in mounting structure 90 to thus secure the joint housing to the mounting structure and thereby secure the joint housing to the cable 10. Thus, if cable is subject to forces (e.g. tension or compression forces), it does not pull out of the joint housing. Rather, the load is taken through the steel cable jacket and through the steel joint casing. With this approach, the cables to be connected (e.g. cables 10, 12) are terminated in a joint, resilient to limited axial tension.

Figure 7F:
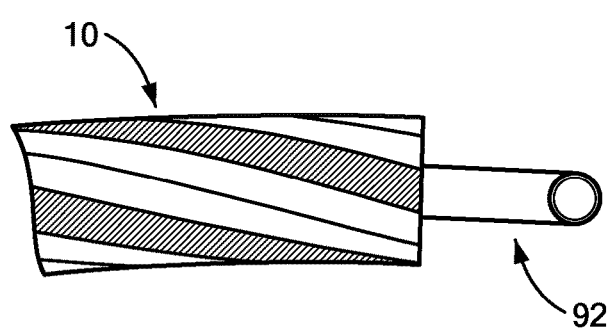
FIGS. 7F-7H are a series of views illustrating a superconducting cable fabricated with a length of tubing protruding from a central opening in the superconducting cable.
Figure 7G:
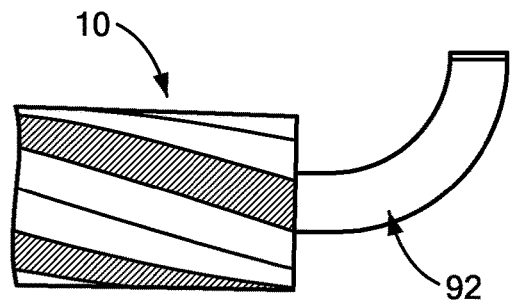
Figure 7H:
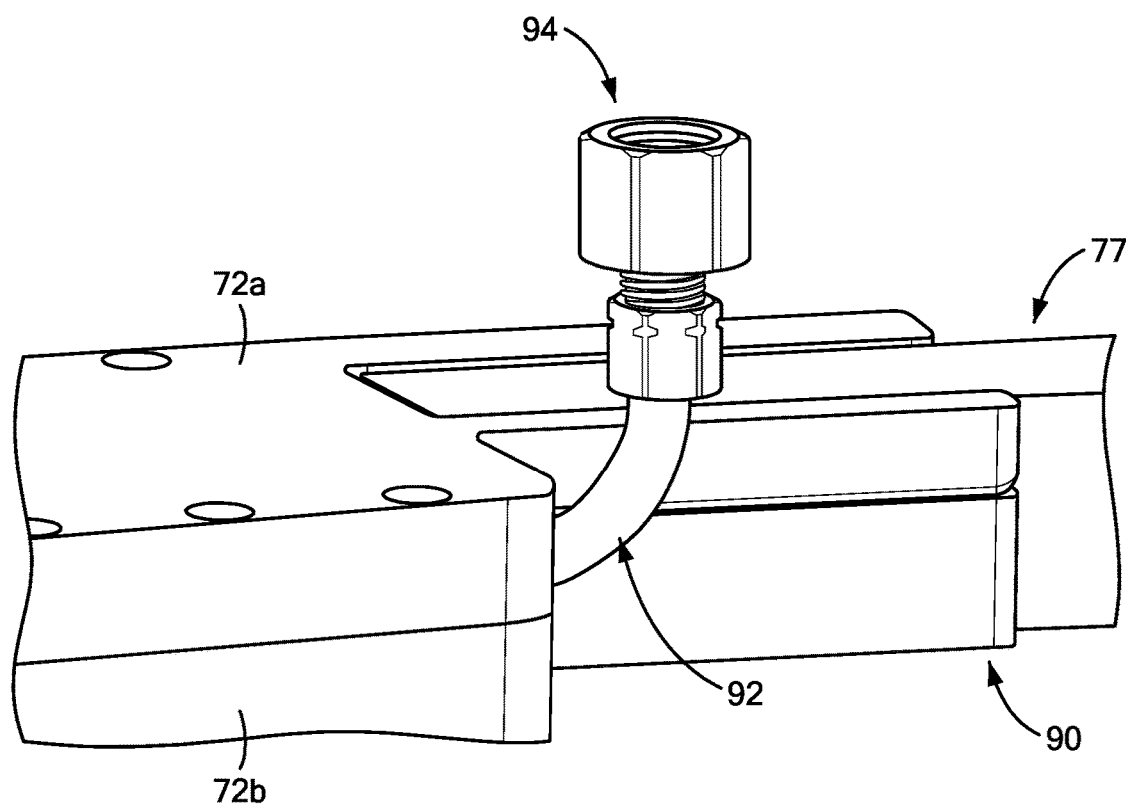

Referring now to FIGS. 7F-7G, shown are a series of views illustrating a superconducting cable fabricated with a length of tubing 92 protruding from a central opening in the superconducting cable. With this approach, and as shown in FIG. 7H, when cable 10 is disposed in the joint 70, the joint configuration allows access to the cooling channel via its exposed ends (e.g. via connector 92). This facilitates good cooling of the joints. In embodiments, the tubing may be provided from copper or any other suitable material. In embodiments, an appropriate cryogenic liquid transfer line connector 92 forms a termination. In embodiments, the bend radius $R_{bend} \geq 12$ mm ($\geq 2*D$ for D/t=12 without a mandrel). An electrical insulation break could be incorporated into termination or on the "feeder" side. As may be most clearly illustrated in FIG. 7B, to join partitioned, twisted cables 10, 12 the two cables are overlapped by at least one full twist so that all petals are exposed to the joint. It is desirable to not overlap the cables by more than one full twist, as this may create current loops that catch magnetic flux. Once the length of the overlapped region is determined, a portioned joint is provided from a plurality of joint elements each having have a size, length and shape sized to fit the cables being joined and the joint length. In embodiments, in which the joint elements have a "double-saddle" shape, double saddle pieces having a length corresponding to the twist pitch divided by the number of petals are formed and the cable mounting surfaces have a radius sized to fit the cables being joined. In one example, embodiment, a 20 cm twist pitch and a 4 partitioned cable gives 5 cm long joint elements. The two portions or hemicylinders of the cables that will be in contact with the mounting surfaces of the double saddle pieces are lightly sanded or lapped to removes oxides and maximizes surface contact to ensure a recued (and ideally, minimal) resistivity from the interfaces. A malleable metal (e.g. an indium wire) is disposed in the mounting surfaces of the double saddle pieces, which increases (and ideally, maximizes) surface area for electrical transfer between the cable and double saddle piece (and thus reduces, and ideally helps to minimize), electrical resistance between the cables and the joint.

The two cables are compressed into the mounting regions of the double saddle piece. This may be accomplished, for example, using an external bolting structure to provide up to 40 MPa of pressure to ensure excellent mechanical contact between the cables and double copper saddle.

This process is simple and able to be completed relatively quickly compared with prior art techniques, with basic tooling and materials. Importantly, the joints can simply be demounted, indium stripped and reapplied to reuse the joint.

The HTS conductors are pressed into the copper/HTS saddle with a malleable metal (e.g. indium) in between. In embodiments in which indium is used, since indium is a soft metal at room temperature, it deforms to allow a very uniform, and thus low resistivity, contact between a conductor (e.g. an HTS conductor) and the mounting surface of the saddle. The surfaces of the HTS cables are prepared through "lapping" or very fine sanding to remove oxides and improve conductivity. The lapping and indium ensure large, uniform surface areas and high electrical conductivity.

In embodiments, a partial insulator may be applied between saddle-shaped copper joint blocks and the cable. Insulation may be applied by adhering an insulator to the cable or to the block in a shape that allows the desired petal surface to be in good electrical contact with the block while insulating the other petals. Insulation material and adhesion method may vary, as described hereinabove.

Referring now to FIGS. 8-10, in some applications it may be necessary to couple two cables having different twist pitches and/or it may be necessary to couple two cables having different numbers of petals (i.e. the number of twist pitches of the cables to be joined may be different and/or the number of petals of the cables to be different). For example, in some applications. the pitch of cable 10 may not be the same as the pitch of cable 12 and/or the number of petals in cable 10 may not be the same as the number of petals in cable 12. In the example embodiments of FIGS. 8-10, it is noted that cables A and B and joint members 100a-100c are shown schematically to promote clarity in illustrating the broader concepts. However, it should be appreciated that cables A and B and joint 100 may be any of the types of cables and joints described herein.

For connecting two cables with different number of petals or twist pitches, it is topologically feasible if both cables do not have a petal straddling the same insulation at the same location. This is shown in the example embodiments of FIGS. 8 and 9 in which a cable A includes five petals (labelled 1-5 in FIG. 8) and a cable B includes three petals (labelled 1-3 in FIG. 8). Cables A and B are coupled by a partitioned joint 100 comprising three joint members 100a, 100b, 100c in FIG. 8 and five joint members 100a-100e in FIG. 9. Thus, in the example of FIG. 8, the number of joint members matches the number or petals in Cable B while in the example of FIG. 9, the number of joint members matches the number or petals in Cable A.

The most efficient cases from a transport current heating perspective are when the cross-sectional area of the portion of the joint member contacting the petal is increased as much as possible (and ideally maximized), or when the insulator between cables and blocks is reduced as much as possible (and ideally minimized). This condition (e.g. maximizing the conductor area and minimizing the insulator area) may occur in configurations in which the number of petals of one cable (either one) matches the number of blocks. Such a configuration is shown in FIGS. 8 and 9. In this configuration, ideally no current loops between petals are formed.

However, as illustrated in FIG. 10, even when the number of joint members does not match the number of petals of either cable, it is still feasible to join the portioned cable with a partitioned cable joint by insulating so that there is always only one petal straddling the insulation line. Thus, the example embodiment of FIG. 10 includes insulation portion 102a between which is disposed between joint member 100b and petal 3 of Cable A to insure there is always only one petal straddling the insulation line.

Also, as noted above, in some embodiments, it may be desirable to couple two cables having different diameters. In this case, the surfaces of the joint elements can have different radii on the sides, mating with the cables even if the cables have different twist pitches and/or different numbers of petals.

In one aspect, structures and techniques described above is simple relative to prior art techniques since the cables themselves (with almost zero modification) form a portion of the joint.

This is in strong contrast to other low temperature and high temperature (LTS, HTS) cables joints and joining techniques that require enormous amount of preparation and precision fabrication that can take on the order of weeks to complete.

One use of the concepts, structures and techniques described herein, is to provide simple, strong, low-resistance, low eddy current, demountable electrical joints (a) between two partitioned HTS cables or (b) between an HTS cable and a current lead. Because the joints are demountable, they also provide the possibility of designing magnets that are fully demountable themselves. This holds great promise for inspection, maintenance, repair, and replacement of magnets, as well as innovative design portions for the systems that contain magnets.

Embodiments described herein provide several advantages over prior art joints for coupling superconducting cables. In embodiments, cable-to-cable joints between round, copper-jacketed HTS cables are created by compressing the cables on either side of a form-fitting copper saddle. With this approach, only a few very simple and limited processing steps are required to create the joint after the cable is fabricated, including light sanding of the copper jacket (lapping), silver-plating the copper jacket, placing indium wire on the copper jacket, and then compressing the cables around the conductive double saddle with up to 40 MPa of pressure through external clamps. No preparation of the HTS tapes or HTS tape stack beyond the original cable fabrication process is required. And the cable joints are fully demountable and reusable with a minimum amount of personnel effort and tooling. This opens the path to the realistic design and fabrication of HTS magnets that are fully demountable in practice.

Although reference is made herein to particular materials, it is appreciated that other materials having similar functional and/or structural properties may be substituted where appropriate, and that a person having ordinary skill in the art would understand how to select such materials and incorporate them into embodiments of the concepts, techniques, and structures set forth herein without deviating from the scope of those teachings.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer or element "A" over layer or element "B" include situations in which one or more intermediate layers or elements (e.g., layer or element "C") is between layer or element "A" and layer or element "B" as long as the relevant characteristics and functionalities of layer or element "A" and layer or element "B" are not substantially changed by the intermediate layer(s) or element(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

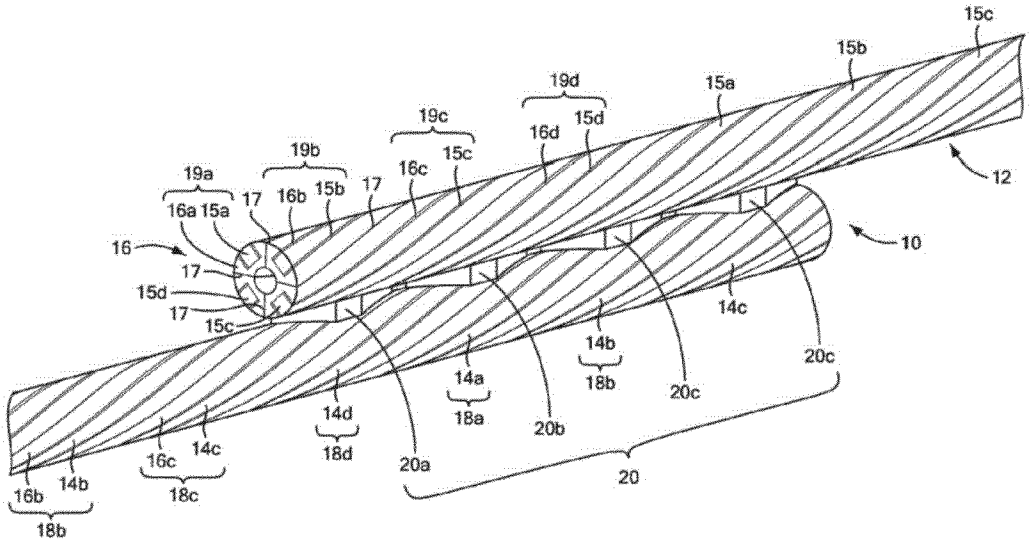

The invention claimed is:

1. A partitioned cable joint comprising a plurality of joint elements, each joint element having a first mounting region having a shape selected to accept one petal of superconducting cable and a second mounting region having a shape selected to accept one petal of a second conductor, the plurality of joint elements taken together defining a joint length and wherein each joint element is provided having a size and a shape selected such that the first mounting region of each joint element is configured to contact only a single petal of a partitioned, twisted high temperature superconducting (HTS) cable.

2. The partitioned cable joint of claim 1 further comprising means for holding the high temperature superconducting cable in the first mounting region and for holding a second conductor in the second mounting region.

3. A partitioned cable joint comprising a plurality of joint elements, each joint element having a first mounting region having a shape selected to accept one petal of superconducting cable and a second mounting region having a shape selected to accept one petal of a second conductor, the plurality of joint elements taken together defining a joint length, wherein the plurality of joint elements have a generally diamond shape.

4. The partitioned cable joint of claim 1 wherein the plurality of joint elements are electrically coupled with or without finite resistivity inserts between them.

5. A partitioned cable joint, comprising:
   a plurality of joint elements that are spaced apart, each of the plurality of joint elements comprising a first mounting region and a second mounting region; and
   a compression structure configured to compresses a first conductor into the first mounting region and a second conductor into the second mounting region,
   wherein the first conductor comprises a partitioned, twisted high temperature superconducting cable.

6. The partitioned cable joint of claim 5, wherein the partitioned, twisted high temperature superconducting cable is a first partitioned, twisted high temperature superconducting cable, wherein the second conductor comprises a comprises a second partitioned, twisted high temperature superconducting cable and each of the plurality of joint elements, electrically connects a single petal of the first partitioned, twisted high temperature superconducting cable to a single petal of the second partitioned, twisted high temperature superconducting cable.

7. The partitioned cable joint of claim 5, wherein the first mounting region is shaped to conform to a shape of the first conductor and the second mounting region is shaped to conform to a shape of the second conductor.

8. The partitioned cable joint of claim 1, wherein:
   the plurality of joint elements are spaced apart;
   the partitioned cable joint further comprises a compression structure configured to compresses the partitioned, twisted HTS cable into the first mounting region and a second conductor into the second mounting region, and wherein the plurality of joint elements have a double saddle shape.

9. A partitioned joint for electrically coupling a first superconducting cable having a first plurality of superconducting material segments with a second superconducting cable having a second plurality of superconducting material segments, the partitioned joint comprising:
a plurality of joint elements, including:
a first joint element comprising a conductive material, the first joint element being configured to electrically interconnect a first superconducting material segment of the first plurality of superconducting material segments with a first superconducting material segment of the second plurality of superconducting material segments; and
a second joint element comprising a conductive material, the second joint element being configured to electrically interconnect a second superconducting material segment of the first plurality of superconducting material segments with a second superconducting material segment of the second plurality of superconducting material segments,
wherein the first joint element is electrically isolated from the second joint element.

10. The partitioned joint of claim 9, wherein the first plurality of superconducting material segments comprises a plurality of high temperature superconductor (HTS) material segments.

11. The partitioned joint of claim 10, wherein the plurality of HTS material segments comprises a plurality of HTS tapes.

12. The partitioned joint of claim 9, wherein the first plurality of superconducting material segments are twisted about an axis of the first superconducting cable.

13. The partitioned joint of claim 9, wherein the first joint element is displaced from the second joint element along an axial direction of the first superconducting cable.

14. The partitioned joint of claim 9, wherein the first joint element has a first mounting region configured to accept the first superconducting cable and the second joint element has a second mounting region configured to accept the second superconducting cable.

15. The partitioned joint of claim 14, wherein the first mounting region has a recess to accept the first superconducting cable.

16. The partitioned joint of claim 14, further comprising a compression structure configured to hold the first superconducting cable in the first mounting region and the second superconducting cable in the second mounting region.

17. The partitioned joint of claim 9, wherein the plurality of joint elements further comprises a third joint element comprising a conductive material, the third joint element being configured to electrically interconnect a third superconducting material segment of the first plurality of superconducting material segments with a third superconducting material segment of the second plurality of superconducting material segments.

18. A partitioned joint, comprising:
a first joint element having a first mounting region to accept a superconducting cable at a first location along the superconducting cable to electrically connect the first joint element to a first superconducting material segment of the superconducting cable; and
a second joint element having a second mounting region to accept the superconducting cable at a second location along the superconducting cable to electrically connect the second joint element to a second superconducting material segment of the superconducting cable,
wherein the first joint element is electrically conductive, the second joint element is electrically conductive, and the first joint element is electrically isolated from the second joint element.

19. The partitioned joint of claim 18, wherein the first superconducting material segment comprises a first high temperature superconductor material.

* * * * *

UNITED STATES PATENT AND TRADEMARK OFFICE
CERTIFICATE OF CORRECTION

| | |
|---|---|
| PATENT NO. | : 12,062,879 B2 |
| APPLICATION NO. | : 17/333314 |
| DATED | : August 13, 2024 |
| INVENTOR(S) | : Christopher Craighill et al. |

It is certified that error appears in the above-identified patent and that said Letters Patent is hereby corrected as shown below:

On the Title Page

Please delete the Title page and insert the attached Title Page showing the corrected number of claims.

In the Claims

Column 20, Line 43 Claim 5, delete "configured to compresses a first" and replace with --configured to compress a first--.

Column 20, Line 51-52 Claim 6, delete "second conductor comprises a comprises a second partitioned," and replace with --second conductor comprises a second partitioned,--.

Column 22, after Claim 19, please add the following claims:

20. The partitioned cable joint of claim 1 further comprising a dielectric material disposed between at least a portion of a surface of the plurality of joint elements and a portion of a surface of a cable to be joined.

21. The partitioned cable joint of claim 1 further comprising a dielectric material disposed between the plurality of joint elements to electrically isolate each joint element from each of the other joint elements.

22. The partitioned cable joint of claim 1 further comprising a malleable metal disposed in a mounting surface of the first and second mounting regions of the plurality of joint elements such that in response to a cable being disposed in the mounting region, the malleable metal deforms to form a continuous, contiguous interface layer between the surface of the mounting regions and surfaces of the cables to be joined.

23. The partitioned cable joint of claim 1 wherein the plurality of joint elements have a generally block shape.

Signed and Sealed this
Twentieth Day of May, 2025

Coke Morgan Stewart
*Acting Director of the United States Patent and Trademark Office*

24. The partitioned cable joint of claim 20 wherein the plurality of joint elements are provided as joint blocks having a generally block shape and the dielectric material is disposed about the joint blocks to form a conductive joint block surface having a generally diamond shape.

25. The partitioned cable joint of claim 1 wherein the plurality of joint elements have a double saddle shape and the partitioned cable joint further comprises a dielectric material disposed about the joint elements.

26. The partitioned cable joint of claim 5 wherein the compression structure comprises a clamp.

27. The partitioned cable joint of claim 5, further comprising a malleable metal between the first conductor and at least one joint element.

28. The partitioned joint of claim 9, further comprising an electrically insulating material between the first joint element and the second joint element.

CERTIFICATE OF CORRECTION (continued)

(12) United States Patent
Craighill et al.

(10) Patent No.: US 12,062,879 B2
(45) Date of Patent: Aug. 13, 2024

(54) PARTITIONED CABLE JOINT FOR SUPERCONDUCTING CABLES

(71) Applicants: Massachusetts Institute of Technology, Cambridge, MA (US); Commonwealth Fusion Systems LLC, Cambridge, MA (US)

(72) Inventors: Christopher Craighill, Cambridge, MA (US); Alexey Radovinsky, Cambridge, MA (US); Rui Vieira, Billerica, MA (US); Vincent Fry, Waltham, MA (US); Colin O'Shea, Cambridge, MA (US); Sera Evcimen, Brookline, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 164 days.

(21) Appl. No.: 17/333,314

(22) Filed: May 28, 2021

(65) Prior Publication Data
US 2021/0376498 A1 Dec. 2, 2021

Related U.S. Application Data

(60) Provisional application No. 63/032,277, filed on May 29, 2020.

(51) Int. Cl.
*H01R 4/00* (2006.01)
*H01B 12/02* (2006.01)
*H01R 4/68* (2006.01)

(52) U.S. Cl.
CPC .............. *H01R 4/68* (2013.01); *H01B 12/02* (2013.01)

(58) Field of Classification Search
CPC .................................. H01R 4/68; H01B 12/02
See application file for complete search history.

(56) References Cited

U.S. PATENT DOCUMENTS

| | | |
|---|---|---|
| 2,309,607 A | 1/1943 | Rogoff |
| 8,437,819 B2 | 5/2013 | Takayasu et al. |
| 9,183,970 B2 | 11/2015 | Maeda et al. |
| 9,941,032 B2 | 4/2018 | Jin et al. |
| 10,062,485 B2 | 8/2018 | Iwasa et al. |
| 10,079,092 B2 | 9/2018 | Iwasa et al. |
| 2014/0243207 A1 | 8/2014 | Takayasu |

(Continued)

FOREIGN PATENT DOCUMENTS

| CA | 3 170 080 | 9/2021 |
|---|---|---|
| CN | 106911014 | 6/2017 |

(Continued)

OTHER PUBLICATIONS

CN107104293 Englsih Translation (Year: 2017).*
(Continued)

*Primary Examiner* — Pete T Lee
(74) *Attorney, Agent, or Firm* — Daly, Crowley, Mofford & Durkee, LLP

(57) ABSTRACT

Described is a partitioned cable joint comprising a plurality of physically distributed joint elements with the plurality of joint elements taken together defining a joint length. Joint elements may have a first mounting region having a shape selected to accept one petal of superconducting cable and a second mounting region having a shape selected to accept one petal of a second conductor.

28 Claims, 13 Drawing Sheets